United States Patent
Shih et al.

(10) Patent No.: US 11,653,315 B2
(45) Date of Patent: May 16, 2023

(54) METHOD AND APPARATUS FOR TRIGGERING AND CANCELING POWER HEADROOM REPORT (PHR) IN SMALL DATA TRANSMISSION PROCEDURE IN A WIRELESS COMMUNICATION SYSTEM

(71) Applicant: ASUSTek Computer Inc., Taipei (TW)

(72) Inventors: Tun-Huai Shih, Taipei (TW); Yu-Hsuan Guo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 49 days.

(21) Appl. No.: 16/952,458

(22) Filed: Nov. 19, 2020

(65) Prior Publication Data
US 2021/0211994 A1    Jul. 8, 2021

Related U.S. Application Data

(60) Provisional application No. 62/956,692, filed on Jan. 3, 2020, provisional application No. 62/956,693, filed on Jan. 3, 2020.

(51) Int. Cl.
| | |
|---|---|
| *H04W 76/00* | (2018.01) |
| *H04W 52/36* | (2009.01) |
| *H04W 76/27* | (2018.01) |
| *H04W 80/02* | (2009.01) |
| *H04W 76/30* | (2018.01) |
| *H04W 76/19* | (2018.01) |

(52) U.S. Cl.
CPC ......... *H04W 52/365* (2013.01); *H04W 76/19* (2018.02); *H04W 76/27* (2018.02); *H04W 76/30* (2018.02); *H04W 80/02* (2013.01)

(58) Field of Classification Search
CPC ... H04W 52/365; H04W 76/19; H04W 76/27; H04W 76/30; H04W 80/02; H04W 52/54; H04W 72/1268; H04W 74/0833
See application file for complete search history.

(56) References Cited

U.S. PATENT DOCUMENTS

| | | | |
|---|---|---|---|
| 2013/0028223 A1* | 1/2013 | Kim | H04L 5/0091 370/329 |
| 2018/0132266 A1* | 5/2018 | Chen | H04L 47/626 |
| 2019/0253197 A1* | 8/2019 | Babaei | H04L 1/1887 |
| 2019/0253986 A1* | 8/2019 | Jeon | H04W 72/042 |
| 2019/0327680 A1 | 10/2019 | Xu et al. | |
| 2021/0160791 A1* | 5/2021 | Sha | H04W 52/365 |
| 2021/0329559 A1* | 10/2021 | Huang | H04W 76/27 |

FOREIGN PATENT DOCUMENTS

WO        2020034560 A1    2/2020

\* cited by examiner

*Primary Examiner* — Lakeram Jangbahadur
(74) *Attorney, Agent, or Firm* — Cooper Legal Group LLC

(57) ABSTRACT

A method and apparatus are disclosed. In an example from the perspective of a User Equipment (UE), the UE triggers a Power Headroom Report (PHR) when the UE is in Radio Resource Control (RRC) inactive state. The UE determines whether or not to cancel the PHR based upon whether or not an uplink (UL) resource for transmission in the RRC inactive state can accommodate first pending data available for transmission.

18 Claims, 18 Drawing Sheets

METHOD AND APPARATUS FOR TRIGGERING AND CANCELING POWER HEADROOM REPORT (PHR) IN SMALL DATA TRANSMISSION PROCEDURE IN A WIRELESS COMMUNICATION SYSTEM

CROSS-REFERENCE TO RELATED APPLICATIONS

The present application claims the benefit of U.S. Provisional Patent Application Ser. No. 62/956,692 filed on Jan. 3, 2020, the entire disclosure of which is incorporated herein in its entirety by reference. The present application also claims the benefit of U.S. Provisional Patent Application Ser. No. 62/956,693 filed on Jan. 3, 2020, the entire disclosure of which is incorporated herein in its entirety by reference.

FIELD

This disclosure generally relates to wireless communication networks, and more particularly, to a method and apparatus for triggering and canceling a Power Headroom Report (PHR) in a small data transmission procedure in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE), the UE triggers a Power Headroom Report (PHR) when the UE is in Radio Resource Control (RRC) inactive state. The UE determines whether or not to cancel the PHR based upon whether or not an uplink (UL) resource for transmission in the RRC inactive state can accommodate first pending data available for transmission.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3rd Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: 3GPP TS 38.300 V15.7.0, "NR, NR and NG-RAN overall description, Stage 2"; 3GPP TS 38.321 V15.7.0, "NR, MAC protocol specification"; 3GPP TS 38.331 V15.7.0, "NR, RRC protocol specification"; RP-193252, "New Work Item on NR small data transmissions in INACTIVE state". The standards and documents listed above are hereby expressly incorporated by reference in their entirety.

Figure 1:
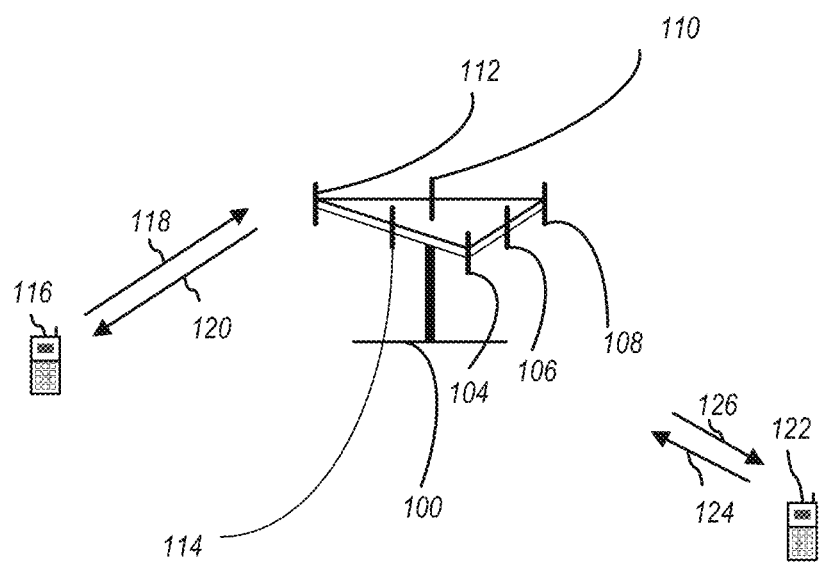
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
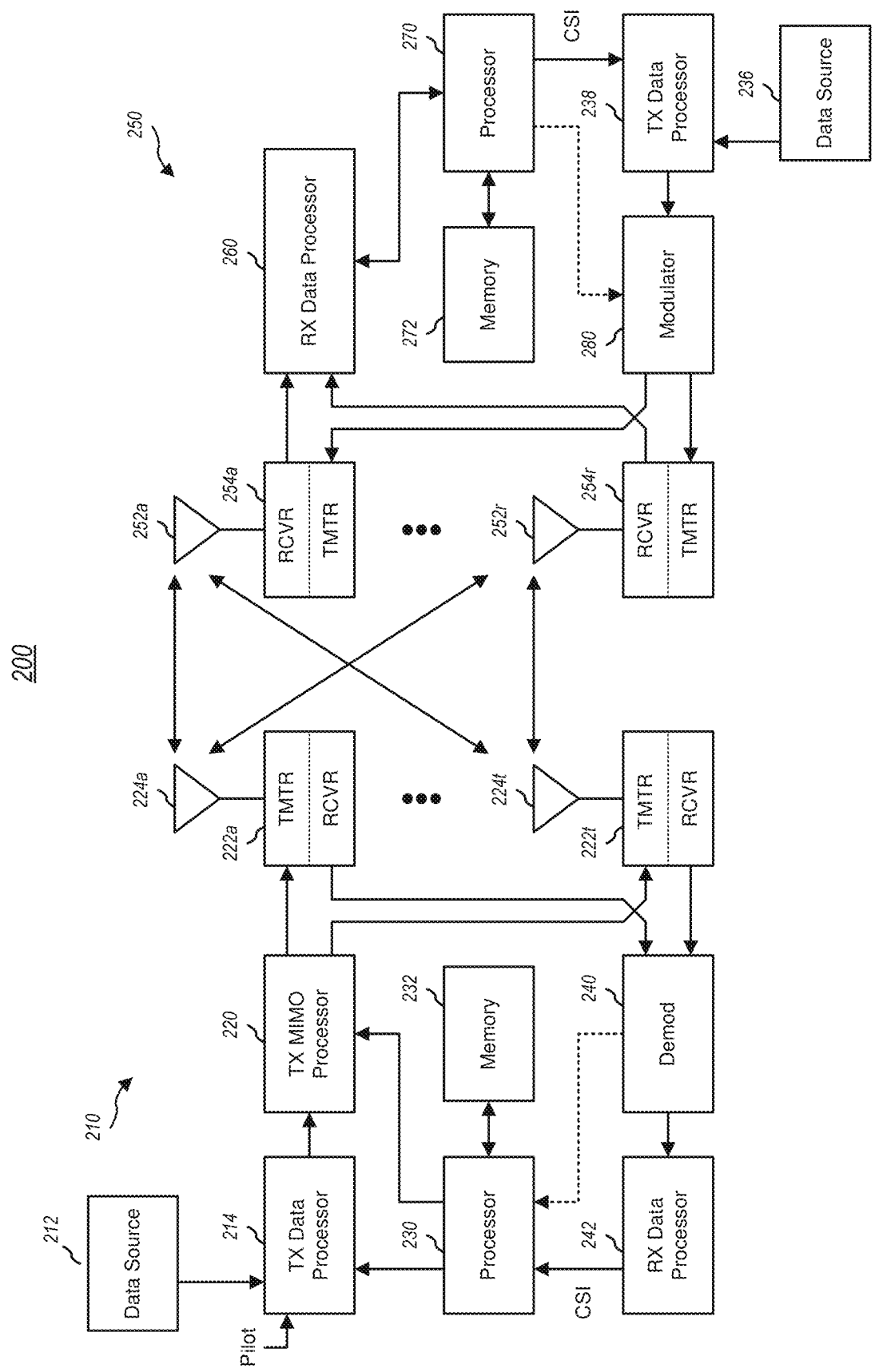
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
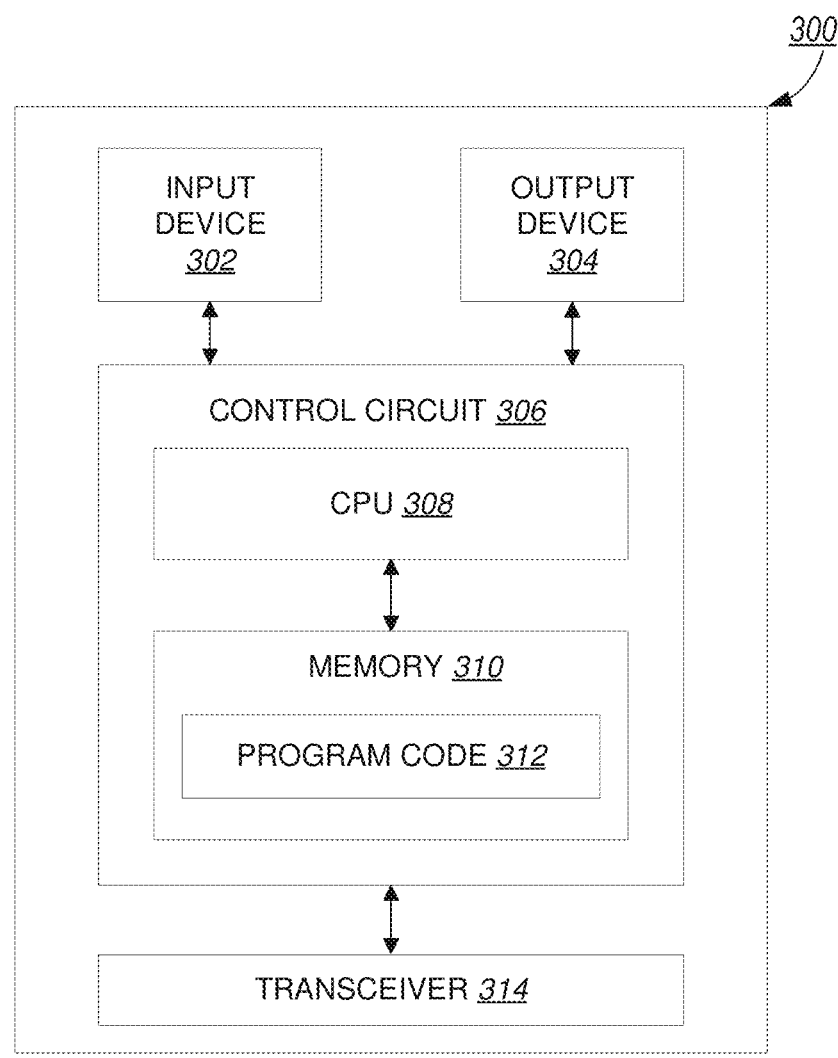
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
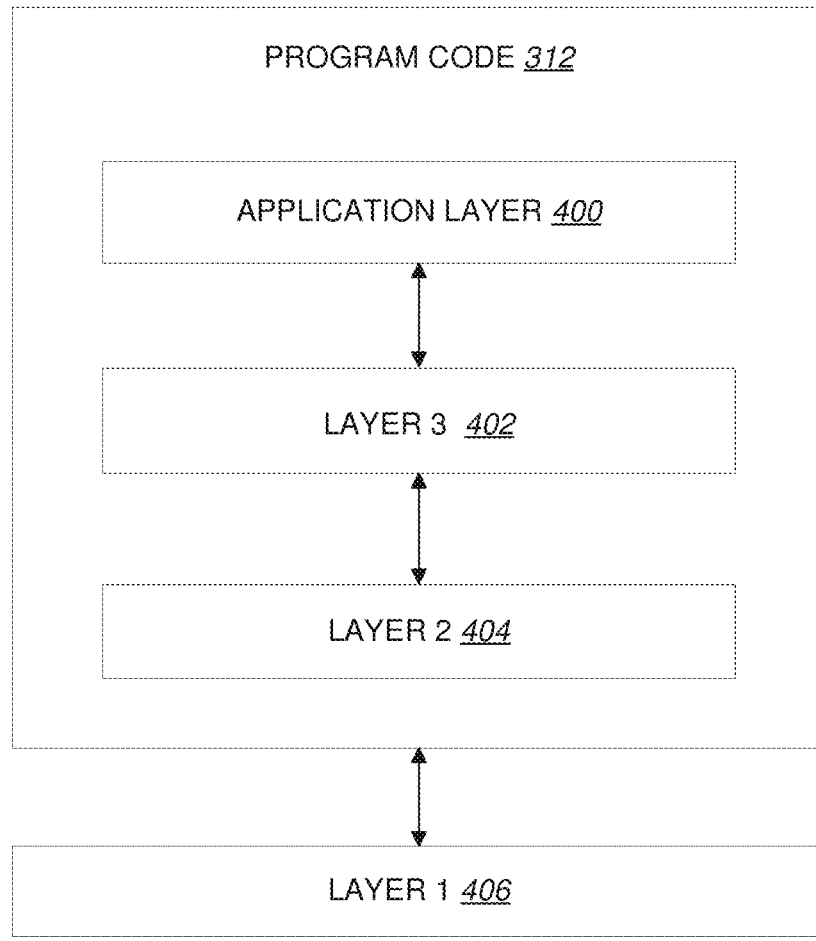
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

Some texts related to scheduling in NR are quoted below from 3GPP TS 38.300 V15.7.0:
10 Scheduling
10.1 Basic Scheduler Operation
In order to utilise radio resources efficiently, MAC in gNB includes dynamic resource schedulers that allocate physical layer resources for the downlink and the uplink. In this clause, an overview of the scheduler is given in terms of scheduler operation, signalling of scheduler decisions, and measurements.
Scheduler Operation:
  Taking into account the UE buffer status and the QoS requirements of each UE and associated radio bearers, schedulers assign resources between UEs;
  Schedulers may assign resources taking account the radio conditions at the UE identified through measurements made at the gNB and/or reported by the UE;
  Schedulers assign radio resources in a unit of slot (e.g. one mini-slot, one slot, or multiple slots);
  Resource assignment consists of radio resources (resource blocks).

Signalling of Scheduler Decisions:
  UEs identify the resources by receiving a scheduling (resource assignment) channel.
Measurements to Support Scheduler Operation:
  Uplink buffer status reports (measuring the data that is buffered in the logical channel queues in the UE) are used to provide support for QoS-aware packet scheduling;
  Power headroom reports (measuring the difference between the nominal UE maximum transmit power and the estimated power for uplink transmission) are used to provide support for power aware packet scheduling.
10.2 Downlink Scheduling
In the downlink, the gNB can dynamically allocate resources to UEs via the C-RNTI on PDCCH(s). A UE always monitors the PDCCH(s) in order to find possible assignments when its downlink reception is enabled (activity governed by DRX when configured). When CA is configured, the same C-RNTI applies to all serving cells.

The gNB may pre-empt an ongoing PDSCH transmission to one UE with a latency-critical transmission to another UE. The gNB can configure UEs to monitor interrupted transmission indications using INT-RNTI on a PDCCH. If a UE receives the interrupted transmission indication, the UE may assume that no useful information to that UE was carried by the resource elements included in the indication, even if some of those resource elements were already scheduled to this UE.

In addition, with Semi-Persistent Scheduling (SPS), the gNB can allocate downlink resources for the initial HARQ transmissions to UEs: RRC defines the periodicity of the configured downlink assignments while PDCCH addressed to CS-RNTI can either signal and activate the configured downlink assignment, or deactivate it; i.e. a PDCCH addressed to CS-RNTI indicates that the downlink assignment can be implicitly reused according to the periodicity defined by RRC, until deactivated.

NOTE: When required, retransmissions are explicitly scheduled on PDCCH(s).

The dynamically allocated downlink reception overrides the configured downlink assignment in the same serving cell, if they overlap in time. Otherwise a downlink reception according to the configured downlink assignment is assumed, if activated.

When CA is configured, at most one configured downlink assignment can be signalled per serving cell. When BA is configured, at most one configured downlink assignment can be signalled per BWP. On each serving cell, there can be only one configured downlink assignment active at a time. Activation and deactivation of configured downlink assignments are independent among the serving cells.
10.3 Uplink Scheduling
In the uplink, the gNB can dynamically allocate resources to UEs via the C-RNTI on PDCCH(s). A UE always monitors the PDCCH(s) in order to find possible grants for uplink transmission when its downlink reception is enabled (activity governed by DRX when configured). When CA is configured, the same C-RNTI applies to all serving cells.

In addition, with Configured Grants, the gNB can allocate uplink resources for the initial HARQ transmissions to UEs. Two types of configured uplink grants are defined:
  With Type 1, RRC directly provides the configured uplink grant (including the periodicity).
  With Type 2, RRC defines the periodicity of the configured uplink grant while PDCCH addressed to CS-RNTI can either signal and activate the configured uplink grant, or deactivate it; i.e. a PDCCH addressed to CS-RNTI indicates that the uplink grant can be implicitly reused according to the periodicity defined by RRC, until deactivated.

The dynamically allocated uplink transmission overrides the configured uplink grant in the same serving cell, if they overlap in time. Otherwise an uplink transmission according to the configured uplink grant is assumed, if activated.

Retransmissions other than repetitions are explicitly allocated via PDCCH(s).

When CA is configured, at most one configured uplink grant can be signalled per serving cell. When BA is configured, at most one configured uplink grant can be signalled per BWP. On each serving cell, there can be only one configured uplink grant active at a time. A configured uplink grant for one serving cell can either be of Type 1 or Type 2. For Type 2, activation and deactivation of configured uplink grants are independent among the serving cells. When SUL is configured, a configured uplink grant can only be signalled for one of the 2 ULs of the cell.

Figure 7:
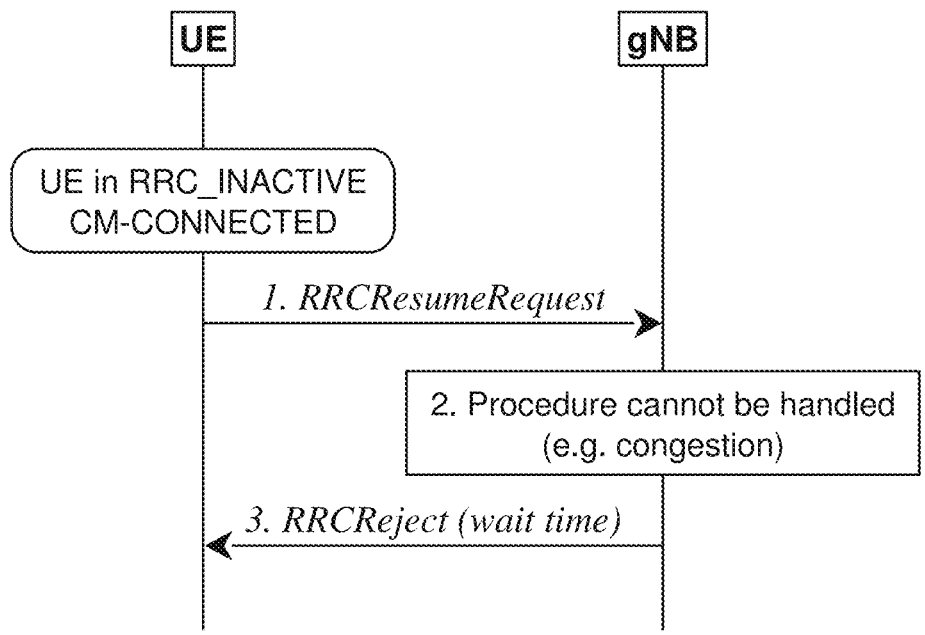
FIG. 7 is a diagram illustrating an exemplary scenario associated with a UE attempting to resume a connection, according to one exemplary embodiment.
Figure 8:
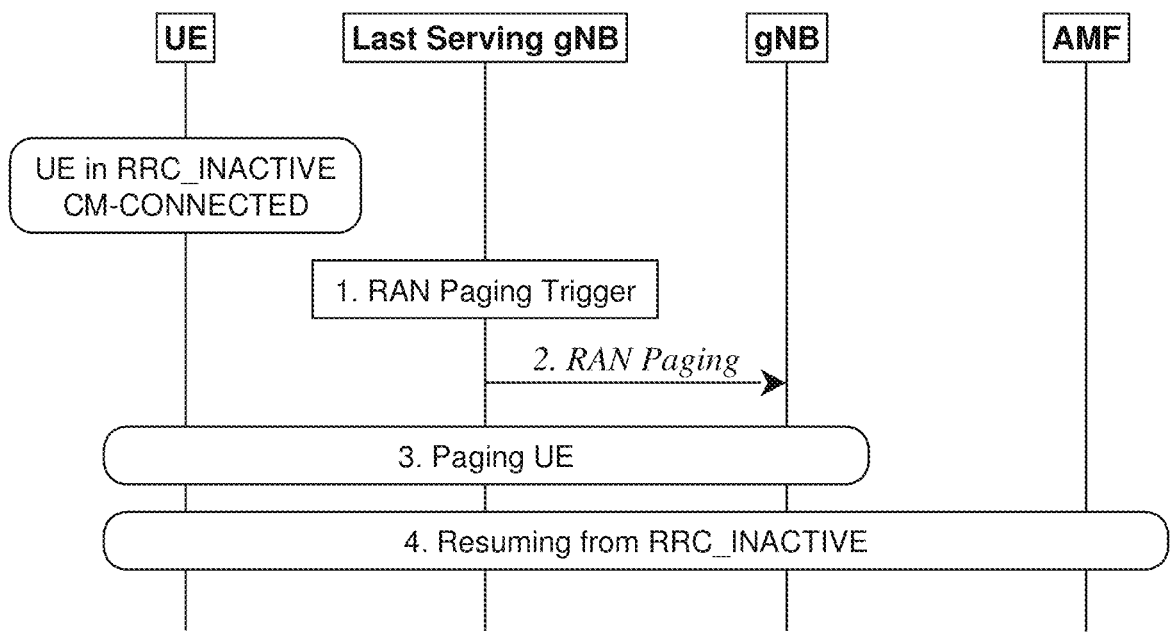
FIG. 8 is a diagram illustrating an exemplary scenario associated with a network triggered transition from RRC_INACTIVE state to RRC_CONNECTED state, according to one exemplary embodiment.
Figure 9:
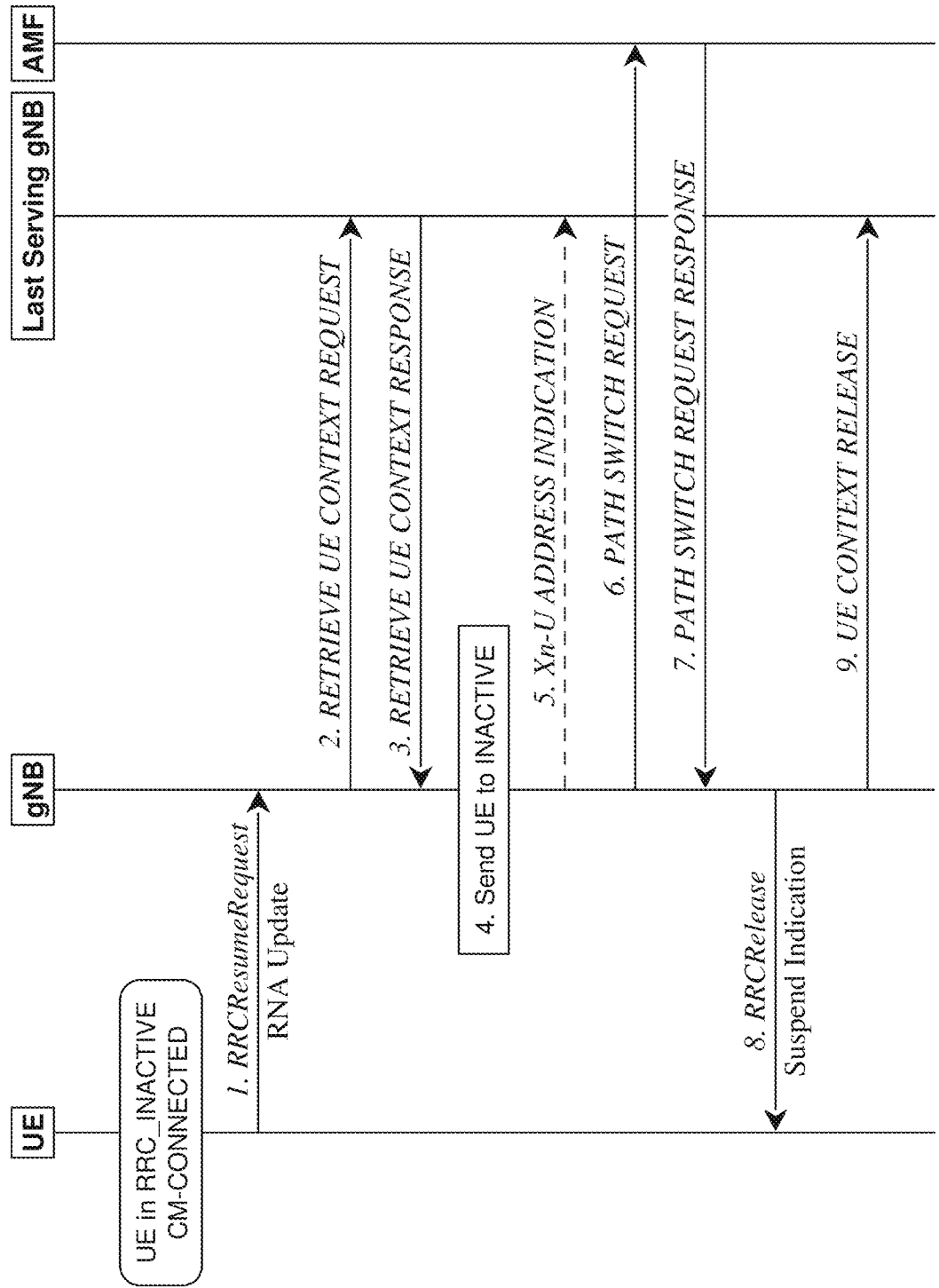
FIG. 9 is a diagram illustrating an exemplary scenario associated with Radio Access Network-based Notification Area (RNA) update procedure with UE context relocation, according to one exemplary embodiment.
Figure 10:
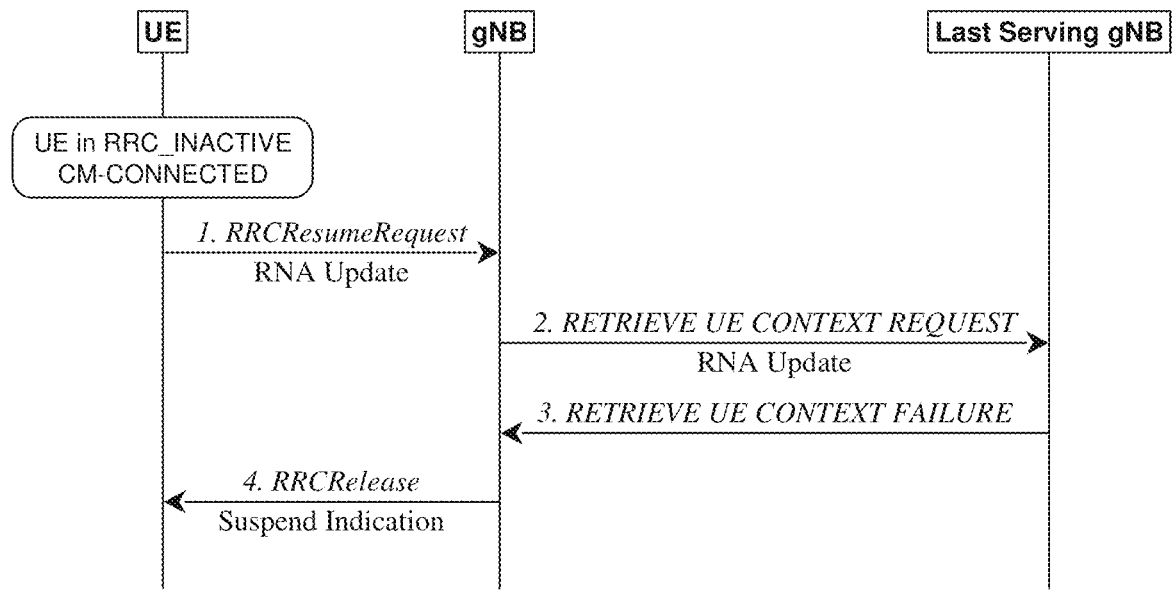
FIG. 10 is a diagram illustrating an exemplary scenario associated with periodic RNA update procedure without UE context relocation, according to one exemplary embodiment.
Figure 11:
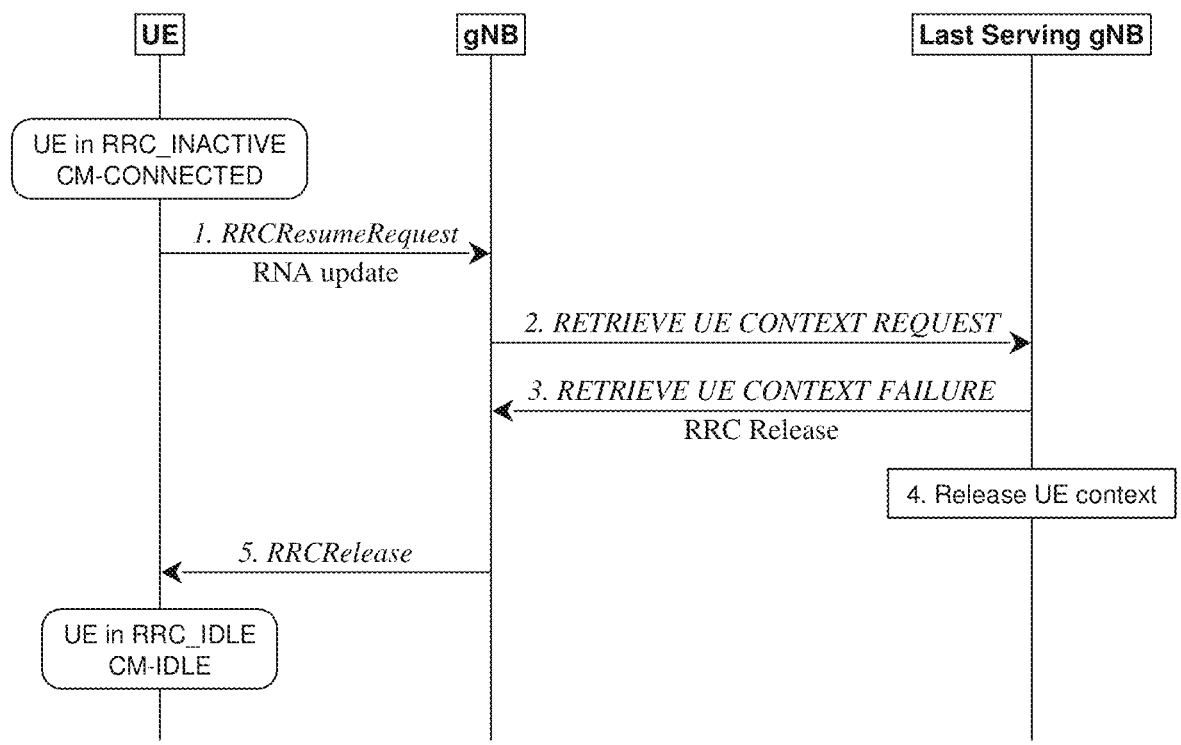
FIG. 11 is a diagram illustrating an exemplary scenario associated with RNA update procedure with transition to RRC_IDLE state, according to one exemplary embodiment.

Some texts related to RRC_INACTIVE state in NR are quoted below from 3GPP TS 38.300 V15.7.0. Notably, FIG. 9.2.2.4.1-1 of Section 9.2.2.4.1 of 3GPP TS 38.300 V15.7.0, entitled "UE triggered transition from RRC_INACTIVE to RRC_CONNECTED (UE context retrieval success)", is reproduced herein as FIG. 5. FIG. 9.2.2.4.1-2 of Section 9.2.2.4.1 of 3GPP TS 38.300 V15.7.0, entitled "UE triggered transition from RRC_INACTIVE to RRC_CONNECTED (UE context retrieval failure)", is reproduced herein as FIG. 6. FIG. 9.2.2.4.1-3 of Section 9.2.2.4.1 of 3GPP TS 38.300 V15.7.0, entitled "Reject from the network, UE attempts to resume a connection", is reproduced herein as FIG. 7. FIG. 9.2.2.4.2-1 of Section 9.2.2.4.2 of 3GPP TS 38.300 V15.7.0, entitled "Network triggered transition from RRC_INACTIVE to RRC_CONNECTED", is reproduced herein as FIG. 8. FIG. 9.2.2.5-1 of Section 9.2.2.5 of 3GPP TS 38.300 V15.7.0, entitled "RNA update procedure with UE context relocation", is reproduced herein as FIG. 9. FIG. 9.2.2.5-2 of Section 9.2.2.5 of 3GPP TS 38.300 V15.7.0, entitled "Periodic RNA update procedure without UE context relocation", is reproduced herein as FIG. 10. FIG. 9.2.2.5-3 of Section 9.2.2.5 of 3GPP TS 38.300 V15.7.0, entitled "RNA update procedure with transition to RRC_IDLE", is reproduced herein as FIG. 11.

9.2.2 Mobility in RRC_INACTIVE 9.2.2.1 Overview

RRC_INACTIVE is a state where a UE remains in CM-CONNECTED and can move within an area configured by NG-RAN (the RNA) without notifying NG-RAN. In RRC_INACTIVE, the last serving gNB node keeps the UE context and the UE-associated NG connection with the serving AMF and UPF.

If the last serving gNB receives DL data from the UPF or DL UE-associated signalling from the AMF (except the UE Context Release Command message) while the UE is in RRC_INACTIVE, it pages in the cells corresponding to the RNA and may send XnAP RAN Paging to neighbour gNB(s) if the RNA includes cells of neighbour gNB(s).

Upon receiving the UE Context Release Command message while the UE is in RRC_INACTIVE, the last serving gNB may page in the cells corresponding to the RNA and may send XnAP RAN Paging to neighbour gNB(s) if the RNA includes cells of neighbour gNB(s), in order to release UE explicitly.

Upon receiving the NG RESET message while the UE is in RRC_INACTIVE, the last serving gNB may page involved UEs in the cells corresponding to the RNA and may send XnAP RAN Paging to neighbour gNB(s) if the RNA includes cells of neighbour gNB(s) in order to explicitly release involved UEs.

Upon RAN paging failure, the gNB behaves according to TS 23.501 [3].

The AMF provides to the NG-RAN node the Core Network Assistance Information to assist the NG-RAN node's decision whether the UE can be sent to RRC_INACTIVE. The Core Network Assistance Information includes the registration area configured for the UE, the Periodic Registration Update timer, and the UE Identity Index value, and may include the UE specific DRX, an indication if the UE is configured with Mobile Initiated Connection Only (MICO) mode by the AMF, and the Expected UE Behaviour. The UE registration area is taken into account by the NG-RAN node when configuring the RNA. The UE specific DRX and UE Identity Index value are used by the NG-RAN node for RAN paging. The Periodic Registration Update timer is taken into account by the NG-RAN node to configure Periodic RNA Update timer. The NG-RAN node takes into account the Expected UE Behaviour to assist the UE RRC state transition decision.

At transition to RRC_INACTIVE the NG-RAN node may configure the UE with a periodic RNA Update timer value. At periodic RNA Update timer expiry without notification from the UE, the gNB behaves as specified in TS 23.501 [3].

If the UE accesses a gNB other than the last serving gNB, the receiving gNB triggers the XnAP Retrieve UE Context procedure to get the UE context from the last serving gNB and may also trigger an Xn-U Address Indication procedure including tunnel information for potential recovery of data from the last serving gNB. Upon successful UE context retrieval, the receiving gNB shall perform the slice-aware admission control in case of receiving slice information and becomes the serving gNB and it further triggers the NGAP Path Switch Request and applicable RRC procedures. After the path switch procedure, the serving gNB triggers release of the UE context at the last serving gNB by means of the XnAP UE Context Release procedure.

In case the UE is not reachable at the last serving gNB, the gNB shall:

Fail any AMF initiated UE-associated class 1 procedure which allows the signalling of unsuccessful operation in the respective response message; and Trigger the NAS Non Delivery Indication procedure to report the non-delivery of any NAS PDU received from the AMF for the UE.

If the UE accesses a gNB other than the last serving gNB and the receiving gNB does not find a valid UE Context, the receiving gNB can perform establishment of a new RRC connection instead of resumption of the previous RRC connection. UE context retrieval will also fail and hence a new RRC connection needs to be established if the serving AMF changes.

A UE in the RRC_INACTIVE state is required to initiate RNA update procedure when it moves out of the configured RNA. When receiving RNA update request from the UE, the receiving gNB triggers the XnAP Retrieve UE Context procedure to get the UE context from the last serving gNB and may decide to send the UE back to RRC_INACTIVE state, move the UE into RRC_CONNECTED state, or send the UE to RRC_IDLE. In case of periodic RNA update, if the last serving gNB decides not to relocate the UE context, it fails the Retrieve UE Context procedure and sends the UE back to RRC_INACTIVE, or to RRC_IDLE directly by an encapsulated RRCRelease message.

9.2.2.2 Cell Reselection

A UE in RRC_INACTIVE performs cell reselection. The principles of the procedure are as for the RRC_IDLE state (see clause 9.2.1.2).

9.2.2.3 RAN-Based Notification Area

A UE in the RRC_INACTIVE state can be configured by the last serving NG-RAN node with an RNA, where:
- the RNA can cover a single or multiple cells, and shall be contained within the CN registration area; in this release Xn connectivity should be available within the RNA;
- a RAN-based notification area update (RNAU) is periodically sent by the UE and is also sent when the cell reselection procedure of the UE selects a cell that does not belong to the configured RNA.

There are several different alternatives on how the RNA can be configured:

List of cells:
- A UE is provided an explicit list of cells (one or more) that constitute the RNA.

List of RAN areas:
- A UE is provided (at least one) RAN area ID, where a RAN area is a subset of a CN Tracking Area or equal to a CN Tracking Area. A RAN area is specified by one RAN area ID, which consists of a TAC and optionally a RAN area Code;
- A cell broadcasts one or more RAN area IDs in the system information.

NG-RAN may provide different RNA definitions to different UEs but not mix different definitions to the same UE at the same time. UE shall support all RNA configuration options listed above.

9.2.2.4 State Transitions

9.2.2.4.1 UE Triggered Transition from RRC_INACTIVE to RRC_CONNECTED

The following figure describes the UE triggered transition from RRC_INACTIVE to RRC_CONNECTED in case of UE context retrieval success:

FIG. 9.2.2.4.1-1: UE Triggered Transition from RRC_INACTIVE to RRC_CONNECTED (UE Context Retrieval Success)

1. The UE resumes from RRC_INACTIVE, providing the I-RNTI, allocated by the last serving gNB.
2. The gNB, if able to resolve the gNB identity contained in the I-RNTI, requests the last serving gNB to provide UE Context data.
3. The last serving gNB provides UE context data.
4/5. The gNB and UE completes the resumption of the RRC connection.
NOTE: User Data can also be sent in step 5 if the grant allows.
6. If loss of DL user data buffered in the last serving gNB shall be prevented, the gNB provides forwarding addresses.
7/8. The gNB performs path switch.
9. The gNB triggers the release of the UE resources at the last serving gNB.

After step 1 above, when the gNB decides to reject the Resume Request and keep the UE in RRC_INACTIVE without any reconfiguration (e.g. as described in the two examples below), or when the gNB decides to setup a new RRC connection, SRB0 (without security) can be used. When the gNB decides to reconfigure the UE (e.g. with a new DRX cycle or RNA) or when the gNB decides to push the UE to RRC_IDLE, SRB1 (with at least integrity protection) shall be used.
NOTE: SRB1 can only be used once the UE Context is retrieved i.e. after step 3.

The following figure describes the UE triggered transition from RRC_INACTIVE to RRC_CONNECTED in case of UE context retrieval failure:

FIG. 9.2.2.4.1-2: UE Triggered Transition from RRC_INACTIVE to RRC_CONNECTED (UE Context Retrieval Failure)

1. The UE resumes from RRC_INACTIVE, providing the I-RNTI, allocated by the last serving gNB.
2. The gNB, if able to resolve the gNB identity contained in the I-RNTI, requests the last serving gNB to provide UE Context data.
3. The last serving gNB cannot retrieve or verify the UE context data.
4. The last serving gNB indicates the failure to the gNB.
5. The gNB performs a fallback to establish a new RRC connection by sending RRCSetup.
6. A new connection is setup as described in clause 9.2.1.3.1.

The following figure describes the rejection form the network when the UE attempts to resume a connection from RRC_INACTIVE:

FIG. 9.2.2.4.1-3: Reject from the Network, UE Attempts to Resume a Connection

1. UE attempts to resume the connection from RRC_INACTIVE.
2. The gNB is not able to handle the procedure, for instance due to congestion.
3. The gNB sends RRCReject (with a wait time) to keep the UE in RRC_INACTIVE.

9.2.2.4.2 Network Triggered Transition from RRC_INACTIVE to RRC_CONNECTED

The following figure describes the network triggered transition from RRC_INACTIVE to RRC_CONNECTED:

FIG. 9.2.2.4.2-1: Network Triggered Transition from RRC_INACTIVE to RRC_CONNECTED 1. A RAN paging trigger event occurs (incoming DL user plane, DL signalling from 5GC, etc.).
2. RAN paging is triggered; either only in the cells controlled by the last serving gNB or also by means of Xn RAN Paging in cells controlled by other gNBs, configured to the UE in the RAN-based Notification Area (RNA).
3. The UE is paged with the I-RNTI.
4. If the UE has been successfully reached, it attempts to resume from RRC_INACTIVE, as described in clause 9.2.2.4.1.

9.2.2.5 RNA Update

The following figure describes the UE triggered RNA update procedure involving context retrieval over Xn. The procedure may be triggered when the UE moves out of the configured RNA, or periodically.

FIG. 9.2.2.5-1: RNA Update Procedure with UE Context Relocation

1. The UE resumes from RRC_INACTIVE, providing the I-RNTI allocated by the last serving gNB and appropriate cause value, e.g., RAN notification area update.

2. The gNB, if able to resolve the gNB identity contained in the I-RNTI, requests the last serving gNB to provide UE Context, providing the cause value received in step 1.
3. The last serving gNB may provide the UE context (as assumed in the following). Alternatively, the last serving gNB may decide to move the UE to RRC_IDLE (and the procedure follows steps 3 and later of FIG. 9.2.2.5-3) or, if the UE is still within the previously configured RNA, to keep the UE context in the last serving gNB and to keep the UE in RRC_INACTIVE (and the procedure follows steps 3 and later of FIG. 9.2.2.5-2).
4. The gNB may move the UE to RRC_CONNECTED (and the procedure follows step 4 of FIG. 9.2.2.4.1-1), or send the UE back to RRC_IDLE (in which case an RRCRelease message is sent by the gNB), or send the UE back to RRC_INACTIVE as assumed in the following.
5. If loss of DL user data buffered in the last serving gNB shall be prevented, the gNB provides forwarding addresses.
6./7. The gNB performs path switch.
8. The gNB keeps the UE in RRC_INACTIVE state by sending RRCRelease with suspend indication.
9. The gNB triggers the release of the UE resources at the last serving gNB.

The following figure describes the RNA update procedure for the case when the UE is still within the configured RNA and the last serving gNB decides not to relocate the UE context and to keep the UE in RRC_INACTIVE:

FIG. 9.2.2.5-2: Periodic RNA Update Procedure without UE Context Relocation

1. The UE resumes from RRC_INACTIVE, providing the I-RNTI allocated by the last serving gNB and appropriate cause value, e.g., RAN notification area update.
2. The gNB, if able to resolve the gNB identity contained in the I-RNTI, requests the last serving gNB to provide UE Context, providing the cause value received in step 1.
3. The last serving gNB stores received information to be used in the next resume attempt (e.g. C-RNTI and PCI related to the resumption cell), and responds to the gNB with the RETRIEVE UE CONTEXT FAILURE message including an encapsulated RRCRelease message. The RRCRelease message includes Suspend Indication.
4. The gNB forwards the RRCRelease message to the UE.

The following figure describes the RNA update procedure for the case when the last serving gNB decides to move the UE to RRC_IDLE:

FIG. 9.2.2.5-3: RNA Update Procedure with Transition to RRC_IDLE

1. The UE resumes from RRC_INACTIVE, providing the I-RNTI allocated by the last serving gNB and appropriate cause value, e.g., RAN notification area update.
2. The gNB, if able to resolve the gNB identity contained in the I-RNTI, requests the last serving gNB to provide UE Context, providing the cause value received in step 1.
3. Instead of providing the UE context, the last serving gNB provides an RRCRelease message to move the UE to RRC_IDLE.
4. The last serving gNB deletes the UE context.
5. The gNB sends the RRCRelease which triggers the UE to move to RRC_IDLE.

Figure 5:
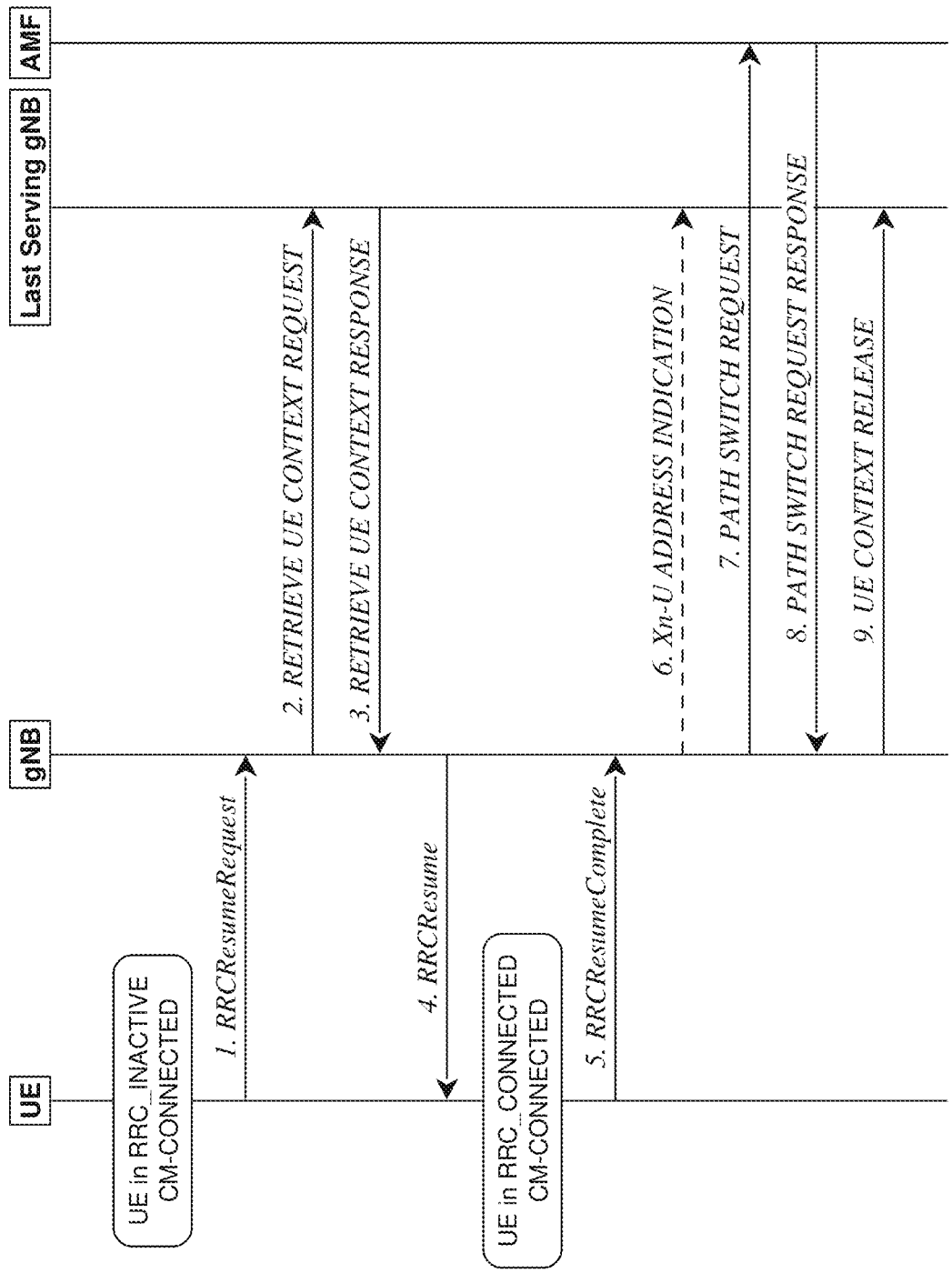
FIG. 5 is a diagram illustrating an exemplary scenario associated with a UE triggered transition from RRC_INACTIVE state to RRC_CONNECTED state, according to one exemplary embodiment.
Figure 12:
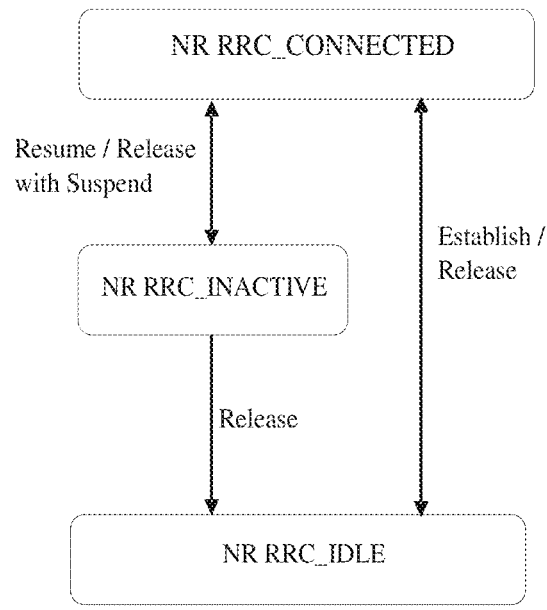
FIG. 12 is a diagram illustrating an exemplary scenario associated with UE state machine and state transitions in New Radio (NR), according to one exemplary embodiment.
Figure 13:
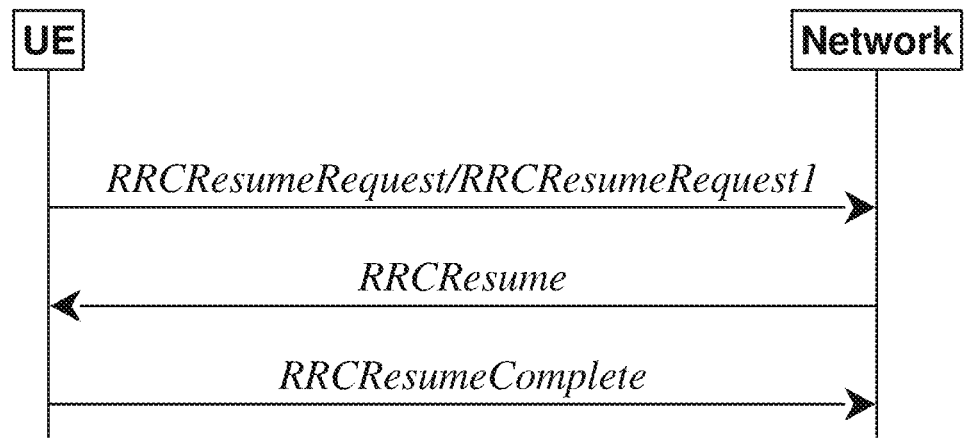
FIG. 13 is a diagram illustrating an exemplary scenario associated with Radio Resource Control (RRC) connection resume, according to one exemplary embodiment.
Figure 14:
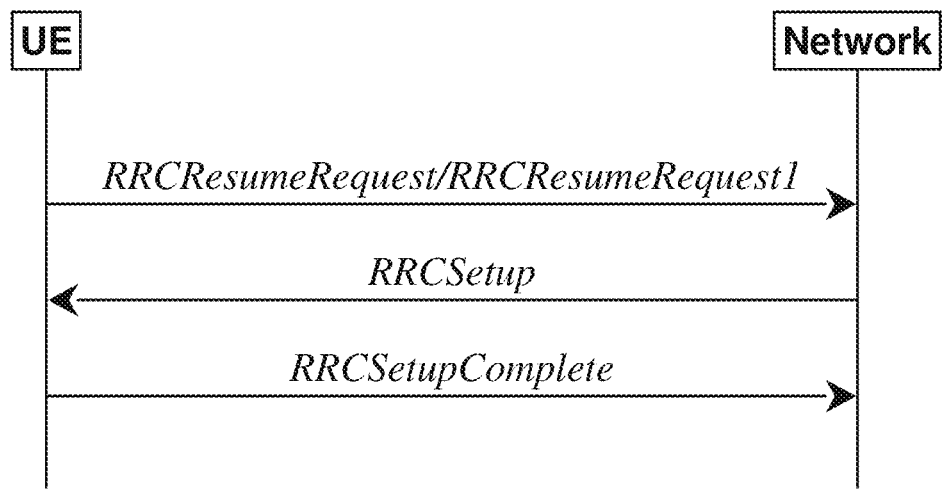
FIG. 14 is a diagram illustrating an exemplary scenario associated with RRC connection establishment, according to one exemplary embodiment.
Figure 15:
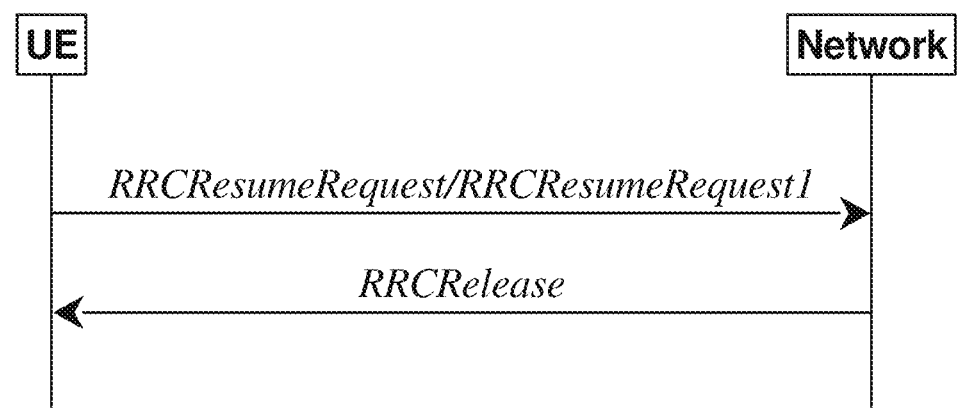
FIG. 15 is a diagram illustrating an exemplary scenario associated with RRC connection resume followed by network release, according to one exemplary embodiment.
Figure 16:
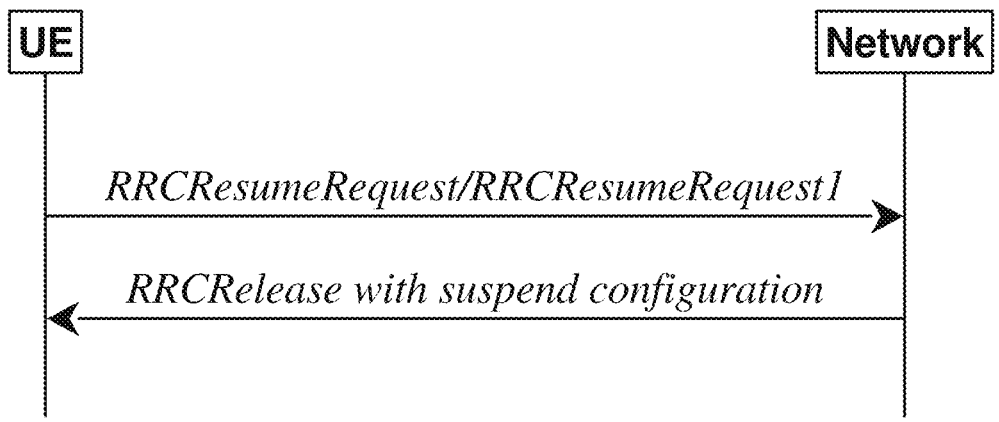
FIG. 16 is a diagram illustrating an exemplary scenario associated with RRC connection resume followed by network suspend, according to one exemplary embodiment.
Figure 17:
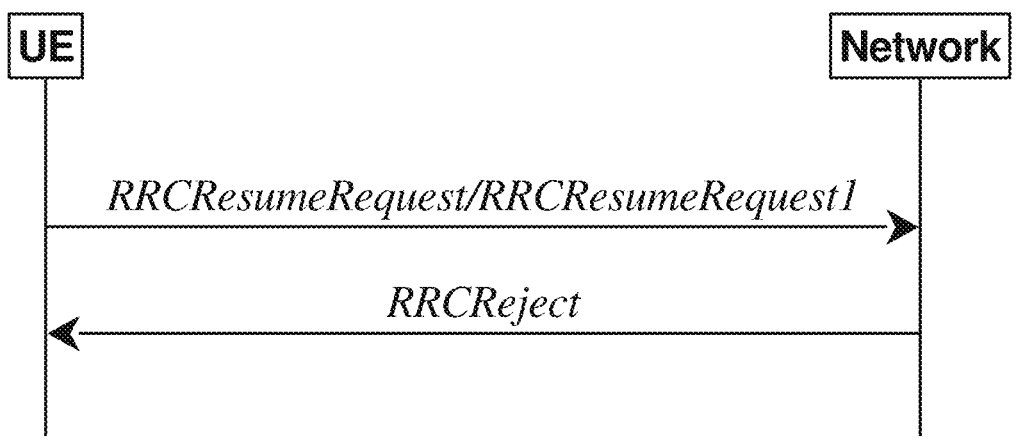
FIG. 17 is a diagram illustrating an exemplary scenario associated with RRC connection resume, according to one exemplary embodiment.

Some texts related to RRC_INACTIVE state in NR are quoted below from 3GPP TS 38.331 V15.7.0. Notably, FIG. 4.2.1-1 of Section 4.2.1 of 3GPP TS 38.331 V15.7.0, entitled "UE state machine and state transitions in NR", is reproduced herein as FIG. 12. FIG. 5.3.13.1-1 of Section 5.3.13.1 of 3GPP TS 38.331 V15.7.0, entitled "RRC connection resume, successful", is reproduced herein as FIG. 13. FIG. 5.3.13.1-2 of Section 5.3.13.1 of 3GPP TS 38.331 V15.7.0, entitled "RRC connection resume fallback to RRC connection establishment, successful", is reproduced herein as FIG. 14. FIG. 5.3.13.1-3 of Section 5.3.13.1 of 3GPP TS 38.331 V15.7.0, entitled "RRC connection resume followed by network release, successful", is reproduced herein as FIG. 15. FIG. 5.3.13.1-4 of Section 5.3.13.1 of 3GPP TS 38.331 V15.7.0, entitled "RRC connection resume followed by network suspend, successful", is reproduced herein as FIG. 16. FIG. 5.3.13.1-5 of Section 5.3.13.1 of 3GPP TS 38.331 V15.7.0, entitled "RRC connection resume, network reject", is reproduced herein as FIG. 17.

4.2.1 UE States and State Transitions Including Inter RAT
  A UE is either in RRC_CONNECTED state or in RRC_INACTIVE state when an RRC connection has been established. If this is not the case, i.e. no RRC connection is established, the UE is in RRC_IDLE state. The RRC states can further be characterised as follows:
  RRC_IDLE:
  A UE specific DRX may be configured by upper layers;
  UE controlled mobility based on network configuration;
  The UE:
    Monitors Short Messages transmitted with P-RNTI over DCI (see clause 6.5);
    Monitors a Paging channel for CN paging using 5G-S-TMSI;
    Performs neighbouring cell measurements and cell (re-)selection;
    Acquires system information and can send SI request (if configured).
  RRC_INACTIVE:
  A UE specific DRX may be configured by upper layers or by RRC layer;
  UE controlled mobility based on network configuration;
  The UE stores the UE Inactive AS context;
  A RAN-based notification area is configured by RRC layer;
  The UE:
    Monitors Short Messages transmitted with P-RNTI over DCI (see clause 6.5);
    Monitors a Paging channel for CN paging using 5G-S-TMSI and RAN paging using fullI-RNTI;
    Performs neighbouring cell measurements and cell (re-)selection;
    Performs RAN-based notification area updates periodically and when moving outside the configured RAN-based notification area;
    Acquires system information and can send SI request (if configured).
  RRC_CONNECTED:
  The UE stores the AS context;
  Transfer of unicast data to/from UE;
  At lower layers, the UE may be configured with a UE specific DRX;
  For UEs supporting CA, use of one or more SCells, aggregated with the SpCell, for increased bandwidth;

For UEs supporting DC, use of one SCG, aggregated with the MCG, for increased bandwidth;

Network controlled mobility within NR and to/from E-UTRA;

The UE:

Monitors Short Messages transmitted with P-RNTI over DCI (see clause 6.5), if configured;

Monitors control channels associated with the shared data channel to determine if data is scheduled for it;

Provides channel quality and feedback information;

Performs neighbouring cell measurements and measurement reporting;

Acquires system information.

FIG. 4.2.1-1 illustrates an overview of UE RRC state machine and state transitions in NR. A UE has only one RRC state in NR at one time.

FIG. 4.2.1-1: UE State Machine and State Transitions in NR 5.3.13 RRC Connection Resume
5.3.13.1 General FIG. 5.3.13.1-1: RRC Connection Resume, Successful FIG. 5.3.13.1-2: RRC Connection Resume Fallback to RRC Connection Establishment, Successful FIG. 5.3.13.1-3: RRC Connection Resume Followed by Network Release, Successful FIG. 5.3.13.1-4: RRC Connection Resume Followed by Network Suspend, Successful FIG. 5.3.13.1-5: RRC Connection Resume, Network Reject The purpose of this procedure is to resume a suspended RRC connection, including resuming SRB(s) and DRB(s) or perform an RNA update.

5.3.13.2 Initiation

The UE initiates the procedure when upper layers or AS (when responding to RAN paging or upon triggering RNA updates while the UE is in RRC_INACTIVE) requests the resume of a suspended RRC connection.

The UE shall ensure having valid and up to date essential system information as specified in clause 5.2.2.2 before initiating this procedure.

Upon initiation of the procedure, the UE shall:
1> if the resumption of the RRC connection is triggered by response to NG-RAN paging:
  2> select '0' as the Access Category;
  2> perform the unified access control procedure as specified in 5.3.14 using the selected Access Category and one or more Access Identities provided by upper layers;
    3> if the access attempt is barred, the procedure ends;
1> else if the resumption of the RRC connection is triggered by upper layers:
  2> if the upper layers provide an Access Category and one or more Access Identities:
    3> perform the unified access control procedure as specified in 5.3.14 using the Access Category and Access Identities provided by upper layers;
      4> if the access attempt is barred, the procedure ends;
  2> set the resumeCause in accordance with the information received from upper layers;
1> else if the resumption of the RRC connection is triggered due to an RNA update as specified in 5.3.13.8:
  2> if an emergency service is ongoing:
NOTE: How the RRC layer in the UE is aware of an ongoing emergency service is up to UE implementation.
    3> select '2' as the Access Category;
    3> set the resumeCause to emergency;
  2> else:
    3> select '8' as the Access Category;
  2> perform the unified access control procedure as specified in 5.3.14 using the selected Access Category and one or more Access Identities to be applied as specified in TS 24.501 [23];
    3> if the access attempt is barred:
      4> set the variable pendingRnaUpdate to true;
      4> the procedure ends;
1> if the UE is in NE-DC or NR-DC:
  2> release the MR-DC related configurations (i.e., as specified in 5.3.5.10) from the UE Inactive AS context, if stored;
1> release the MCG SCell(s) from the UE Inactive AS context, if stored;
1> apply the default L1 parameter values as specified in corresponding physical layer specifications, except for the parameters for which values are provided in SIB;
1> apply the default SRB1 configuration as specified in 9.2.1;
1> apply the default MAC Cell Group configuration as specified in 9.2.2;
1> release delayBudgetReportingConfig from the UE Inactive AS context, if stored;
1> stop timer T342, if running;
1> release overheatingAssistanceConfig from the UE Inactive AS context, if stored;
1> stop timer T345, if running;
1> apply the CCCH configuration as specified in 9.1.1.2;
1> apply the timeAlignmentTimerCommon included in SIB1;
1> start timer T319;
1> set the variable pendingRnaUpdate tofalse;
1> initiate transmission of the RRCResumeRequest message or RRCResumeRequest1 in accordance with 5.3.13.3.

5.3.13.3 Actions Related to Transmission of RRCResumeRequest or RRCResumeRequest1 Message The UE shall set the contents of RRCResumeRequest or RRCResumeRequest1 message as follows:
1> if field useFullResumeID is signalled in SIB1:
  2> select RRCResumeRequest as the message to use;
  2> set the resumeIdentity to the storedfulII-RNTI value;
1> else:
  2> select RRCResumeRequest as the message to use;
  2> set the resumeIdentity to the stored shortI-RNTI value;
1> restore the RRC configuration and the $K_{gNB}$ and $K_{RRCint}$ keys from the stored UE Inactive AS context except the masterCellGroup and pdcp-Config;
1> set the resumeMAC-I to the 16 least significant bits of the MAC-I calculated:
  2> over the ASN.1 encoded as per clause 8 (i.e., a multiple of 8 bits) VarResumeMAC-Input;

2> with the $K_{RRCint}$ key in the UE Inactive AS Context and the previously configured integrity protection algorithm; and
2> with all input bits for COUNT, BEARER and DIRECTION set to binary ones;
1> derive the $K_{gNB}$ key based on the current $K_{gNB}$ key or the NH, using the stored nextHopChainingCount value, as specified in TS 33.501 [11];
1> derive the $K_{RRCenc}$ key, the $K_{RRCint}$ key, the $K_{UPint}$ key and the $K_{UPenc}$ key;
1> configure lower layers to apply integrity protection for all radio bearers except SRB0 using the configured algorithm and the $K_{RRCint}$ key and $K_{UPint}$ key derived in this subclause, i.e., integrity protection shall be applied to all subsequent messages received and sent by the UE;
NOTE 1: Only DRBs with previously configured UP integrity protection shall resume integrity protection.
1> configure lower layers to apply ciphering for all radio bearers except SRB0 and to apply the configured ciphering algorithm, the $K_{RRCenc}$ key and the $K_{UPenc}$ key derived in this subclause, i.e. the ciphering configuration shall be applied to all subsequent messages received and sent by the UE;
1> re-establish PDCP entities for SRB1;
1> resume SRB1;
1> submit the selected message RRCResumeRequest or RRCResumeRequest1 for transmission to lower layers.
NOTE 2: Only DRBs with previously configured UP ciphering shall resume ciphering.
If lower layers indicate an integrity check failure while T319 is running, perform actions specified in 5.3.13.5.
The UE shall continue cell re-selection related measurements as well as cell re-selection evaluation.

5.3.13.4 Reception of the RRCResume by the UE
The UE shall:
1> stop timer T319;
1> stop timer T380, if running;
1> if the RRCResume includes the fullConfig:
   2> perform the full configuration procedure as specified in 5.3.5.11;
1> else:
   2> restore the masterCellGroup and pdcp-Config from the UE Inactive AS context;
1> discard the UE Inactive AS context;
1> release the suspendConfig except the ran-NotificationAreaInfo;
1> if the RRCResume includes the masterCellGroup:
   2> perform the cell group configuration for the received masterCellGroup according to 5.3.5.5;
1> if the RRCResume includes the radioBearerConfig:
   2> perform the radio bearer configuration according to 5.3.5.6;
1> if the RRCResume message includes the sk-Counter:
   2> perform security key update procedure as specified in 5.3.5.7;
1> if the RRCResume message includes the radioBearerConfig2:
   2> perform the radio bearer configuration according to 5.3.5.6;
1> resume SRB2 and all DRBs;
1> if stored, discard the cell reselection priority information provided by the cellReselectionPriorities or inherited from another RAT;
1> stop timer T320, if running;
1> if the RRCResume message includes the measConfig:
   2> perform the measurement configuration procedure as specified in 5.5.2;
1> resume measurements if suspended;
1> if T390 is running:
   2> stop timer T390 for all access categories;
   2> perform the actions as specified in 5.3.14.4;
1> if T302 is running:
   2> stop timer T302;
   2> perform the actions as specified in 5.3.14.4;
1> enter RRC_CONNECTED;
1> indicate to upper layers that the suspended RRC connection has been resumed;
1> stop the cell re-selection procedure;
1> consider the current cell to be the PCell;
1> set the content of the of RRCResumeComplete message as follows:
   2> if the upper layer provides NAS PDU, set the dedicatedNAS-Message to include the information received from upper layers;
   2> if the upper layer provides a PLMN, set the selectedPLMN-Identity to PLMN selected by upper layers (TS 24.501 [23]) from the PLMN(s) included in the plmn-IdentityList in SIB1;
   2> if the masterCellGroup contains the reportUplinkTxDirectCurrent:
     3> include the uplinkTxDirectCurrentList for each serving cell with UL;
     3> if UE is configured with SUL carrier:
       4> include uplinkDirectCurrentBWP-SUL for each serving cell with SUL within the uplinkTxDirectCurrentList;
1> submit the RRCResumeComplete message to lower layers for transmission;
1> the procedure ends.

6.2.2 Message Definitions
RRCRelease
The RRCRelease message is used to command the release of an RRC connection or the suspension of the RRC connection.
Signalling radio bearer: SRB1
RLC-SAP: AM
Logical channel: DCCH
Direction: Network to UE RRCRelease message

```
-- ASN1START
-- TAG-RRCRELEASE-START
RRCRelease ::=                      SEQUENCE {
    rrc-TransactionIdentifier           RRC-TransactionIdentifier,
    criticalExtensions                  CHOICE {
        rrcRelease                          RRCRelease-IEs,
        criticalExtensionsFuture            SEQUENCE { }
    }
}
```

-continued

| RRCRelease message |  |
|---|---|
| RRCRelease-IEs ::= | SEQUENCE { |
|     redirectedCarrierInfo | RedirectedCarrierInfo |
| OPTIONAL, -- Need N |  |
|     cellReselectionPriorities | CellReselectionPriorities |
| OPTIONAL, -- Need R |  |
|     suspendConfig | SuspendConfig |
| OPTIONAL, -- Need R |  |
|     deprioritisationReq | SEQUENCE { |
|         deprioritisationType | ENUMERATED {frequency, nr}, |
|         deprioritisationTimer | ENUMERATED {min5, min10, min15, min30} |
|     } |  |
| OPTIONAL, -- Need N |  |
|     lateNonCriticalExtension | OCTET STRING |
| OPTIONAL, |  |
|     nonCriticalExtension | RRCRelease-v1540-IEs |
| OPTIONAL |  |
| } |  |
| (...) |  |
| SuspendConfig ::= | SEQUENCE { |
|     fullI-RNTI | I-RNTI-Value, |
|     shortI-RNTI | ShortI-RNTI-Value, |
|     ran-PagingCycle | PagingCycle, |
|     ran-NotificationAreaInfo | RAN-NotificationAreaInfo |
| OPTIONAL, -- Need M |  |
|     t380 | PeriodicRNAU-TimerValue |
| OPTIONAL, -- Need R |  |
|     nextHopChainingCount | NextHopChainingCount, |
|     ... |  |
| } |  |
| (...) |  |

| RRCRelease-IEs field descriptions |
|---|
| suspendConfig |
| Indicates configuration for the RRC_INACTIVE state. The network does not configure suspendConfig when the network redirect the UE to an inter-RAT carrier frequency. |

| SuspendConfig field descriptions |
|---|
| ran-NotificationAreaInfo |
| Network ensures that the UE in RRC_INACTIVE always has a valid ran-NotificationAreaInfo. |
| ran-PagingCycle |
| Refers to the UE specific cycle for RAN-initiated paging. Value rf32 corresponds to 32 radio frames, value rf64 corresponds to 64 radio frames and so on. |

-continued

| SuspendConfig field descriptions |
|---|
| t380 |
| Refers to the timer that triggers the periodic RNAU procedure in UE. Value min5 corresponds to 5 minutes, value min10 corresponds to 10 minutes and so on. |

RRCResume

The RRCResume message is used to resume the suspended RRC connection.

Signalling radio bearer: SRB1

RLC-SAP: AM

Logical channel: DCCH

Direction: Network to UE

| RRCResume message |  |
|---|---|
| -- ASN1START |  |
| -- TAG-RRCRESUME-START |  |
| RRCResume ::= | SEQUENCE { |
|     rrc-TransactionIdentifier | RRC-TransactionIdentifier, |
|     criticalExtensions | CHOICE { |
|         rrcResume | RRCResume-IEs, |
|         criticalExtensionsFuture | SEQUENCE { } |
|     } |  |
| } |  |
| RRCResume-IEs ::= | SEQUENCE { |
|     radioBearerConfig | RadioBearerConfig |
| OPTIONAL, -- Need M |  |
|     masterCellGroup | OCTET STRING (CONTAINING CellGroupConfig) OPTIONAL, |
| -- Need M |  |
|     measConfig | MeasConfig |

| RRCResume message |  |
|---|---|
| OPTIONAL, -- Need M |  |
|     fullConfig | ENUMERATED {true} |
| OPTIONAL, -- Need N |  |
|     lateNonCriticalExtension | OCTET STRING |
| OPTIONAL, |  |
|     nonCriticalExtension | RRCResume-v1560-IEs |
| OPTIONAL |  |
| } |  |
| (...) |  |

| RRCResume-IEs field descriptions |
|---|
| masterCellGroup |
| Configuration of the master cell group. |

The CellGroupConfig IE is used to configure a master cell group (MCG) or secondary cell group (SCG). A cell group comprises of one MAC entity, a set of logical channels with associated RLC entities and of a primary cell (SpCell) and one or more secondary cells (SCells).

| CellGroupConfig information element |  |
|---|---|
| -- ASN1START |  |
| -- TAG-CELLGROUPCONFIG-START |  |
| -- Configuration of one Cell-Group: |  |
| CellGroupConfig ::= | SEQUENCE { |
|     cellGroupId | CellGroupId, |
|     (...) |  |
|     mac-CellGroupConfig | MAC-CellGroupConfig |
| OPTIONAL,   -- Need M |  |
|     (...) |  |
| } |  |

| CellGroupConfig field descriptions |
|---|
| mac-CellGroupConfig |
| MAC parameters applicable for the entire cell group. |

MAC-CellGroupConfig

The IE MAC-CellGroupConfig is used to configure MAC parameters for a cell group, including DRX.

| MAC-CellGroupConfig information element |  |
|---|---|
| -- ASN1START |  |
| -- TAG-MAC-CELLGROUPCONFIG-START |  |
| MAC-CellGroupConfig ::= | SEQUENCE { |
|     drx-Config | SetupRelease { DRX-Config } |
| OPTIONAL,   -- Need M |  |
|     schedulingRequestConfig | SchedulingRequestConfig |
| OPTIONAL,   -- Need M |  |
|     bsr-Config | BSR-Config |
| OPTIONAL,   -- Need M |  |
|     tag-Config | TAG-Config |
| OPTIONAL,   -- Need M |  |
|     phr-Config | SetupRelease { PHR-Config } |
| OPTIONAL,   -- Need M |  |
|     (...) |  |
| } |  |

9.2.2 Default MAC Cell Group Configuration Parameters

| Name | Value | Semantics description | Ver |
|---|---|---|---|
| MAC Cell Group configuration |  |  |  |
| bsr-Config |  |  |  |
| >periodicBSR-Timer | sf10 |  |  |
| >retxBSR-Timer | sf80 |  |  |
| phr-Config |  |  |  |
| >phr-PeriodicTimer | sf10 |  |  |
| >phr-ProhibitTimer | sf10 |  |  |
| >phr-Tx-PowerFactorChange | dB1 |  |  |

Figure 18:
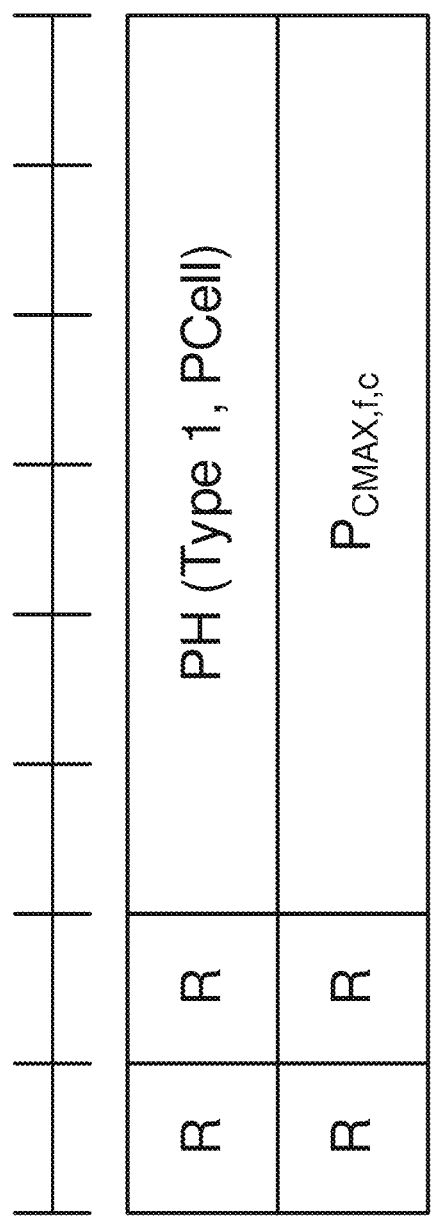
FIG. 18 is a diagram illustrating an exemplary scenario associated with a Single Entry Power Headroom Report (PHR) Medium Access Control Control Element (MAC CE), according to one exemplary embodiment.

Some texts related to Power Headroom Reporting and/or Power Headroom Report (PHR) in NR are quoted below from 3GPP TS 38.321 V15.7.0. Notably, FIG. 6.1.3.8-1 of Section 6.1.3.8 of 3GPP TS 38.321 V15.7.0, entitled "Single Entry PHR MAC CE", is reproduced herein as FIG. 18.

5.4.6 Power Headroom Reporting

The Power Headroom reporting procedure is used to provide the serving gNB with the following information:

- Type 1 power headroom: the difference between the nominal UE maximum transmit power and the estimated power for UL-SCH transmission per activated Serving Cell;
- Type 2 power headroom: the difference between the nominal UE maximum transmit power and the estimated power for UL-SCH and PUCCH transmission on SpCell of the other MAC entity (i.e. E-UTRA MAC entity in EN-DC, NE-DC, and NGEN-DC cases);
- Type 3 power headroom: the difference between the nominal UE maximum transmit power and the estimated power for SRS transmission per activated Serving Cell.

RRC controls Power Headroom reporting by configuring the following parameters:

phr-PeriodicTimer;
phr-ProhibitTimer;
phr-Tx-PowerFactorChange;
phr-Type2OtherCell;
phr-ModeOtherCG;
multiplePHR.

A Power Headroom Report (PHR) shall be triggered if any of the following events occur:

phr-ProhibitTimer expires or has expired and the path loss has changed more than phr-Tx-PowerFactorChange dB for at least one activated Serving Cell of any MAC entity which is used as a pathloss reference since the last transmission of a PHR in this MAC entity when the MAC entity has UL resources for new transmission;

NOTE 1: The path loss variation for one cell assessed above is between the pathloss measured at present time on the current pathloss reference and the pathloss measured at the transmission time of the last transmission of PHR on the pathloss reference in use at that time, irrespective of whether the pathloss reference has changed in between.

phr-Periodic Timer expires;

upon configuration or reconfiguration of the power headroom reporting functionality by upper layers, which is not used to disable the function;

activation of an SCell of any MAC entity with configured uplink;

addition of the PSCell (i.e. PSCell is newly added or changed);

phr-ProhibitTimer expires or has expired, when the MAC entity has UL resources for new transmission, and the following is true for any of the activated Serving Cells of any MAC entity with configured uplink:

there are UL resources allocated for transmission or there is a PUCCH transmission on this cell, and the required power backoff due to power management (as allowed by P-MPRc as specified in TS 38.101-1 [14], TS 38.101-2 [15], and TS 38.101-3 [16]) for this cell has changed more than phr-Tx-PowerFactorChange dB since the last transmission of a PHR when the MAC entity had UL resources allocated for transmission or PUCCH transmission on this cell.

NOTE 2: The MAC entity should avoid triggering a PHR when the required power backoff due to power management decreases only temporarily (e.g. for up to a few tens of milliseconds) and it should avoid reflecting such temporary decrease in the values of $P_{CMAX,f,c}$/PH when a PHR is triggered by other triggering conditions.

If the MAC entity has UL resources allocated for a new transmission the MAC entity shall:

1> if it is the first UL resource allocated for a new transmission since the last MAC reset:
2> start phr-Periodic Timer;
1> if the Power Headroom reporting procedure determines that at least one PHR has been triggered and not cancelled; and
1> if the allocated UL resources can accommodate the MAC CE for PHR which the MAC entity is configured to transmit, plus its subheader, as a result of LCP as defined in clause 5.4.3.1:
2> if multiplePHR with value true is configured:
3> for each activated Serving Cell with configured uplink associated with any MAC entity:
4> obtain the value of the Type 1 or Type 3 power headroom for the corresponding uplink carrier as specified in clause 7.7 of TS 38.213 [6];
4> if this MAC entity has UL resources allocated for transmission on this Serving Cell; or
4> if the other MAC entity, if configured, has UL resources allocated for transmission on this Serving Cell and phr-ModeOtherCG is set to real by upper layers:
5> obtain the value for the corresponding $P_{CMAX,f,c}$ field from the physical layer.
3> if phr-Type2OtherCell with value true is configured:
4> if the other MAC entity is E-UTRA MAC entity:
5> obtain the value of the Type 2 power headroom for the SpCell of the other MAC entity (i.e. E-UTRA MAC entity);
5> if phr-ModeOtherCG is set to real by upper layers:
6> obtain the value for the corresponding $P_{CMAX,f,c}$ field for the SpCell of the other MAC entity (i.e. E-UTRA MAC entity) from the physical layer.
3> instruct the Multiplexing and Assembly procedure to generate and transmit the Multiple Entry PHR MAC CE as defined in clause 6.1.3.9 based on the values reported by the physical layer.
2> else (i.e. Single Entry PHR format is used):
3> obtain the value of the Type 1 power headroom from the physical layer for the corresponding uplink carrier of the PCell;
3> obtain the value for the corresponding $P_{CMAX,f,c}$ field from the physical layer;
3> instruct the Multiplexing and Assembly procedure to generate and transmit the Single Entry PHR MAC CE as defined in clause 6.1.3.8 based on the values reported by the physical layer.
2> start or restart phr-PeriodicTimer;
2> start or restart phr-ProhibitTimer;
2> cancel all triggered PHR(s).

6.1.3.8 Single Entry PHR MAC CE

The Single Entry PHR MAC CE is identified by a MAC subheader with LCID as specified in Table 6.2.1-2.

It has a fixed size and consists of two octets defined as follows (FIG. 6.1.3.8-1):

R: Reserved bit, set to 0;

Power Headroom (PH): This field indicates the power headroom level. The length of the field is 6 bits. The reported PH and the corresponding power headroom levels are shown in Table 6.1.3.8-1 below (the corresponding measured values in dB are specified in TS 38.133 [11]);

$P_{CMAX,f,c}$: This field indicates the $P_{CMAX,f,c}$ (as specified in TS 38.213 [6]) used for calculation of the preceding PH field. The reported $P_{CMAX,f,c}$ and the corresponding nominal UE transmit power levels are shown in Table 6.1.3.8-2 (the corresponding measured values in dBm are specified in TS 38.133 [11]).

Figure 6:
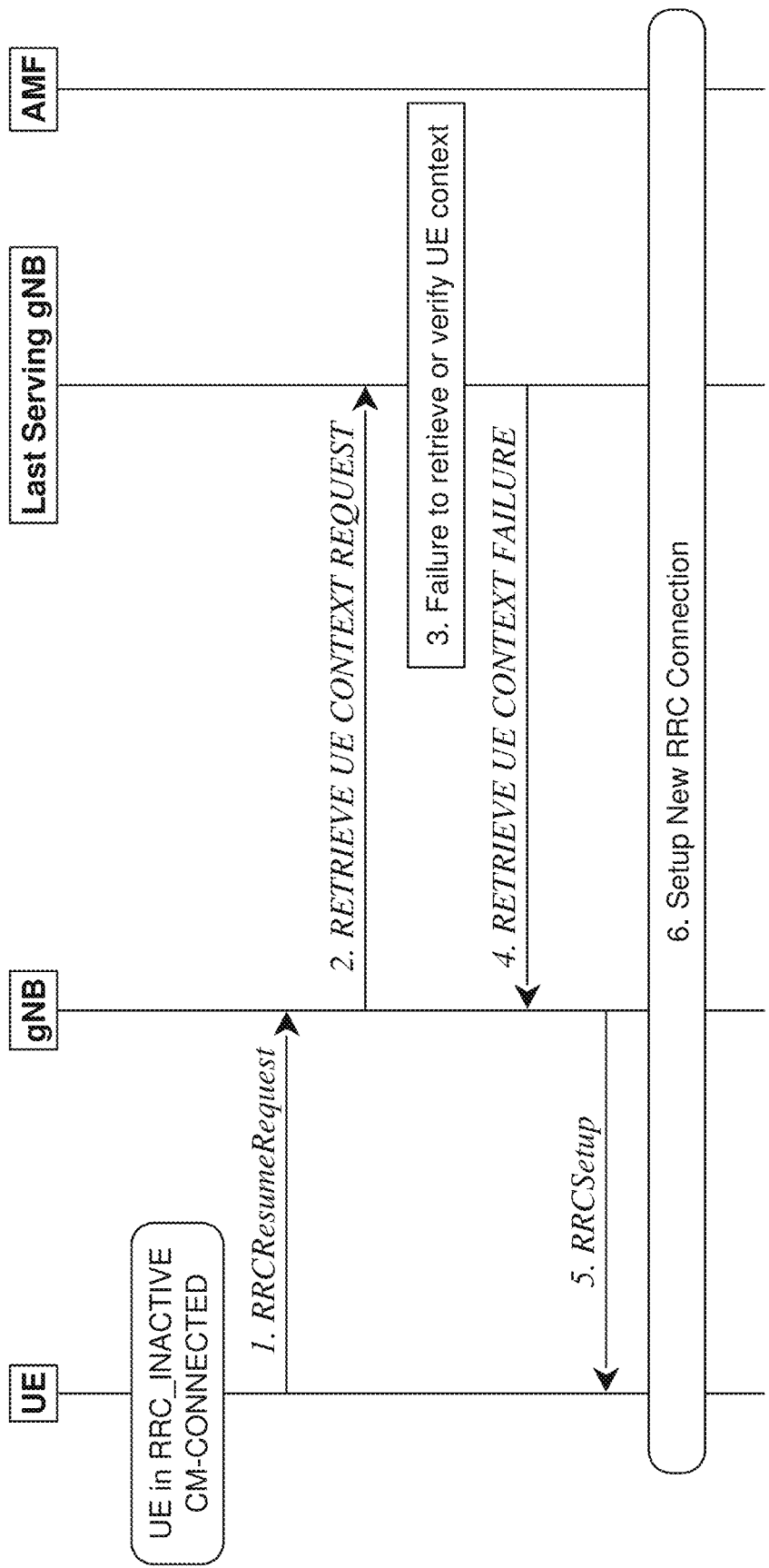
FIG. 6 is a diagram illustrating an exemplary scenario associated with a UE triggered transition from RRC_INACTIVE state to RRC_CONNECTED state, according to one exemplary embodiment.

FIG. 6.1.3.8-1: Single Entry PHR MAC CE

TABLE 6.1.3.8-1

Power Headroom levels for PHR

| PH | Power Headroom Level |
|---|---|
| 0 | POWER_HEADROOM_0 |
| 1 | POWER_HEADROOM_1 |
| 2 | POWER_HEADROOM_2 |
| 3 | POWER_HEADROOM_3 |
| . . . | . . . |
| 60 | POWER_HEADROOM_60 |
| 61 | POWER_HEADROOM_61 |
| 62 | POWER_HEADROOM_62 |
| 63 | POWER_HEADROOM_63 |

TABLE 6.1.3.8-2

Nominal UE transmit power level for PHR

| $P_{CMAX,f,c}$ | Nominal UE transmit power level |
|---|---|
| 0 | PCMAX_C_00 |
| 1 | PCMAX_C_01 |
| 2 | PCMAX_C_02 |
| . . . | . . . |
| 61 | PCMAX_C_61 |
| 62 | PCMAX_C_62 |
| 63 | PCMAX_C_63 |

Some texts related to NR small data transmissions in INACTIVE state are quoted below from RP-193252.

3 Justification

NR supports RRC_INACTIVE state and UEs with infrequent (periodic and/or non-periodic) data transmission are generally maintained by the network in the RRC_INACTIVE state. Until Rel-16, the RRC_INACTIVE state doesn't support data transmission. Hence, the UE has to resume the connection (i.e. move to RRC_CONNECTED state) for any DL (MT) and UL (MO) data. Connection setup and subsequently release to INACTIVE state happens for each data transmission however small and infrequent the data packets are. This results in unnecessary power consumption and signalling overhead.

Specific examples of small and infrequent data traffic include the following use cases:

Smartphone applications:
  Traffic from Instant Messaging services (whatsapp, QQ, wechat etc)
  Heart-beat/keep-alive traffic from IM/email clients and other apps
  Push notifications from various applications
Non-smartphone applications:
  Traffic from wearables (periodic positioning information etc)
  sensors (Industrial Wireless Sensor Networks transmitting temperature, pressure readings periodically or in an event triggered manner etc)
  smart meters and smart meter networks sending periodic meter readings As noted in 3GPP TS 22.891, the NR system shall:
be efficient and flexible for low throughput short data bursts
support efficient signalling mechanisms (e.g. signalling is less than payload)
reduce signalling overhead in general Signalling overhead from INACTIVE state UEs for small data packets is a general problem and will become a critical issue with more UEs in NR not only for network performance and efficiency but also for the UE battery performance. In general, any device that has intermittent small data packets in INACTIVE state will benefit from enabling small data transmission in INACTIVE.

The key enablers for small data transmission in NR, namely the INACTIVE state, 2-step, 4-step RACH and configured grant type-1 have already been specified as part of Rel-15 and Rel-16. So, this work builds on these building blocks to enable small data transmission in INACTIVE state for NR.

4 Objective 4.1 Objective of SI or Core part WI or Testing part WI

This work item enables small data transmission in RRC_INACTIVE state as follows:

For the RRC_INACTIVE state:
  UL small data transmissions for RACH-based schemes (i.e. 2-step and 4-step RACH):
    General procedure to enable UP data transmission for small data packets from INACTIVE state (e.g. using MSGA or MSG3) [RAN2]
    Enable flexible payload sizes larger than the Rel-16 CCCH message size that is possible currently for INACTIVE state for MSGA and MSG3 to support UP data transmission in UL (actual payload size can be up to network configuration) [RAN2]
    Context fetch and data forwarding (with and without anchor relocation) in INACTIVE state for RACH-based solutions [RAN2, RAN3]
    Note 1: The security aspects of the above solutions should be checked with SA3
  Transmission of UL data on pre-configured PUSCH resources (i.e. reusing the configured grant type 1)—when TA is valid
    General procedure for small data transmission over configured grant type 1 resources from INACTIVE state [RAN2]
    Configuration of the configured grant type1 resources for small data transmission in UL for INACTIVE state [RAN2]

No new RRC state should be introduced in this WID. Transmission of smalldata in UL, subsequent transmission of smalldata in UL and DL and the state transition decisions should be under network control.

Focus of the WID should be on licensed carriers and the solutions can be reused for NR-U if applicable.

Note 2: Any associated specification work in RAN1 that is needed to support the above set of objectives should be initiated by RAN2 via an LS.

RRC_INACTIVE state was introduced for UEs with infrequent data transmission. When there is no data transmission, a UE may enter (e.g., the UE may be put into) RRC_INACTIVE state for reducing power consumption. Upon data arrival (e.g., data arrival at the UE when the UE is in RRC_INACTIVE state), the UE may resume a RRC connection from RRC_INACTIVE state (e.g., the UE may resume the RRC connection by performing a Random Access procedure), which is faster than establishing a new RRC connection from RRC_IDLE state (e.g., transition from the RRC_INACTIVE state to resuming the RRC connection may be faster than transition from the RRC_IDLE state to establishing a new RRC connection). After resuming the RRC connection (e.g., after successful completion of the Random Access procedure), the UE is able to transmit data (e.g., data from application layer) in RRC_CONNECTED state.

Although RRC_INACTIVE state has benefits (e.g., reduced power consumption when the UE has no data transmission), the UE may not be able to transmit data in RRC_INACTIVE state. For example, the UE may need to enter RRC_CONNECTED state before transmitting the data. After transmitting the data, the UE enters (e.g., the UE is put into) RRC_INACTIVE state again. Such acts for transmitting data (e.g., one or more acts to enter RRC_CONNECTED state to transmit data, one or more acts to enter RRC_INACTIVE state again after transmitting the data, etc.) may occur for each data transmission, regardless of the amount of data of the data transmission and how frequently data for transmission by the UE arrives, which may result in increased power consumption and/or increased signaling overhead.

To solve the issue of increased power consumption and/or increased signaling overhead, small data transmission in RRC_INACTIVE state may be introduced (such as discussed in RP-193252). An objective of small data transmission is to enable the UE to transmit data in RRC_INACTIVE state without, or before, entering RRC_CONNECTED state. Possible techniques for enabling such transmission may be based upon 2-step and/or 4-step Random Access Channel (RACH) procedure, and/or pre-configured PUSCH resources (e.g., Type-1 configured grant in NR). Small data transmission in RRC_INACTIVE state may be referred to as "Early Data Transmission (EDT) in RRC_INACTIVE state". Small data transmission in RRC_INACTIVE state may be referred to as "Transmission using Preconfigured Uplink Resources (PUR) in RRC_INACTIVE state".

A small data transmission procedure may comprise small data transmission by the UE. The small data transmission procedure may be a RRC resume procedure (e.g., RRC connection resume procedure). The small data may be transmitted by an uplink (UL) resource (e.g., at least one of a pre-configured PUSCH resource, an UL resource for Msg3, an UL resource for MsgA, etc.).

It is possible that subsequent transmission of second small data in UL and/or downlink (DL) occurs after the UE transmits or receives first small data in RRC_INACTIVE state. In an example, the second small data may be a response to the first small data, and/or a direction of transmission of the second small data may be different than a direction of transmission of the first small data. For example, the second small data may be a DL signal and the first small data may be an UL signal (e.g., the DL signal may be in response to the UL signal). Alternatively and/or additionally, the second small data may be an UL signal and the first small data may be a DL signal (e.g., the UL signal may be in response to the DL signal). In some examples, the subsequent transmission of the second small data may be performed in response to an UL and/or DL resource not accommodating all pending data available for transmission. It is stated in RP-193252 that subsequent transmission of small data in UL and/or DL, as well as state transmission decisions, should be under network control. For example, after the UE transmits a small data in RRC_INACTIVE state, if there is subsequent DL data, the network may decide to put the UE into RRC_CONNECTED state and transmit the DL data to the UE in RRC_CONNECTED state. Alternatively and/or additionally, the network may decide that the UE stays in RRC_INACTIVE state, and the network may transmit the DL data to the UE in RRC_INACTIVE state. The UE may perform one or more small data transmissions (e.g., one or more subsequent small data transmissions on UL and/or DL that are after a previous small data transmission) in RRC_INACTIVE state. A subsequent small data transmission performed by the UE is for a new transmission (e.g., the subsequent small data transmission may not for retransmission of the previous small data transmission in the same direction, such as UL or DL).

Figure 19:
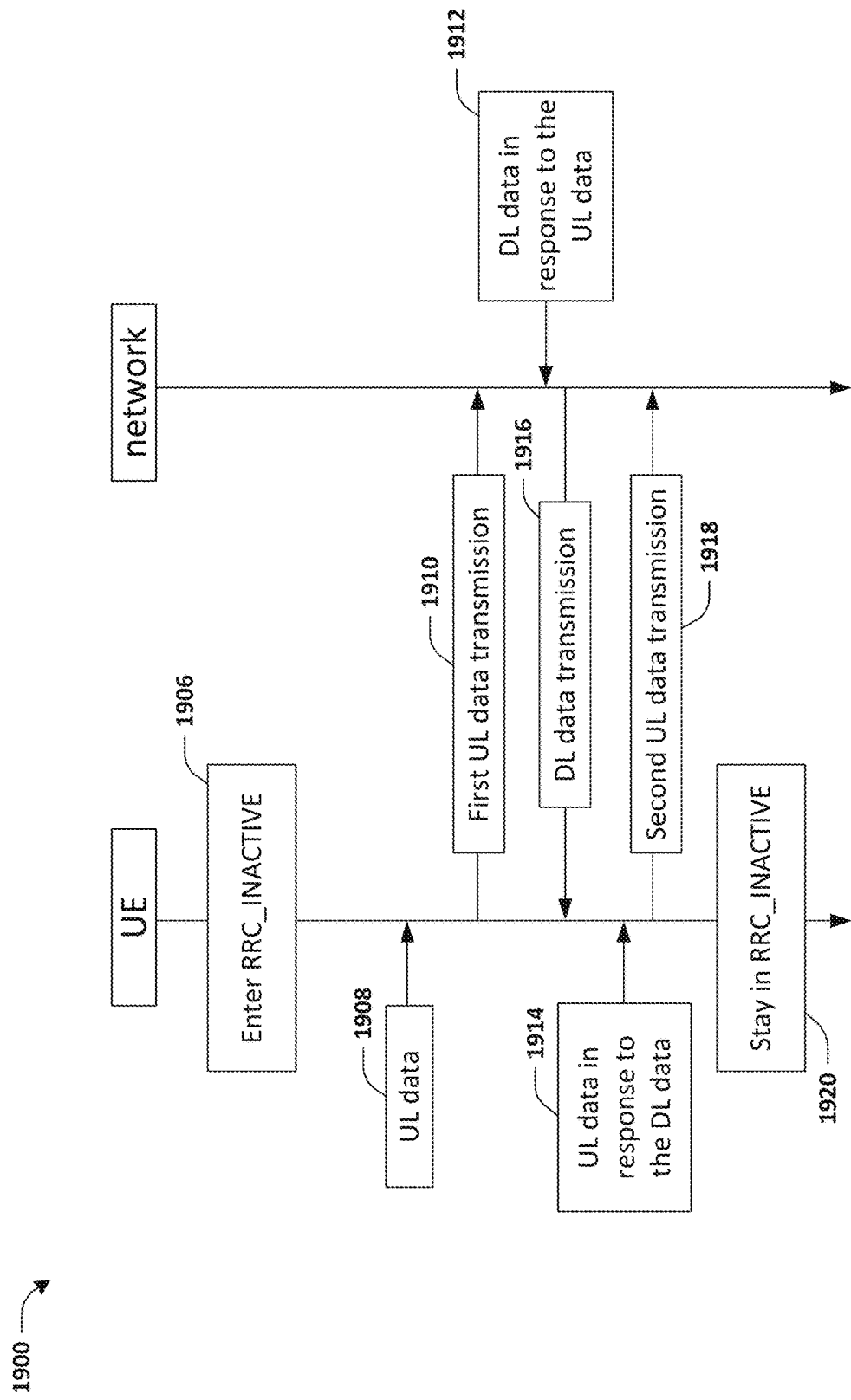
FIG. 19 is a diagram illustrating an exemplary scenario associated with multiple small data transmissions in RRC inactive state, according to one exemplary embodiment.

FIG. 19 illustrates an example scenario 1900 associated with multiple small data transmissions in RRC_INACTIVE state, according to some embodiments. The UE enters 1906 RRC_INACTIVE state. In some examples, the UE performs a first UL data transmission 1910, such as in response to arrival of UL data 1908. In some examples, the network performs a DL data transmission 1916, such as in response to arrival of DL data 1912 (wherein the DL data 1912 and/or the DL data transmission 1916 are in response to the UL data 1908 and/or the first UL data transmission 1910). In some examples, the UE performs a second UL data transmission 1918, such as in response to arrival of UL data 1914 (wherein the UL data 1914 and/or the second UL data transmission 1918 are in response to the DL data 1912 and/or the DL data transmission 1916). The UE stays 1920 in RRC_INACTIVE state throughout UL and DL transmissions of the example scenario 1900.

Figure 20:
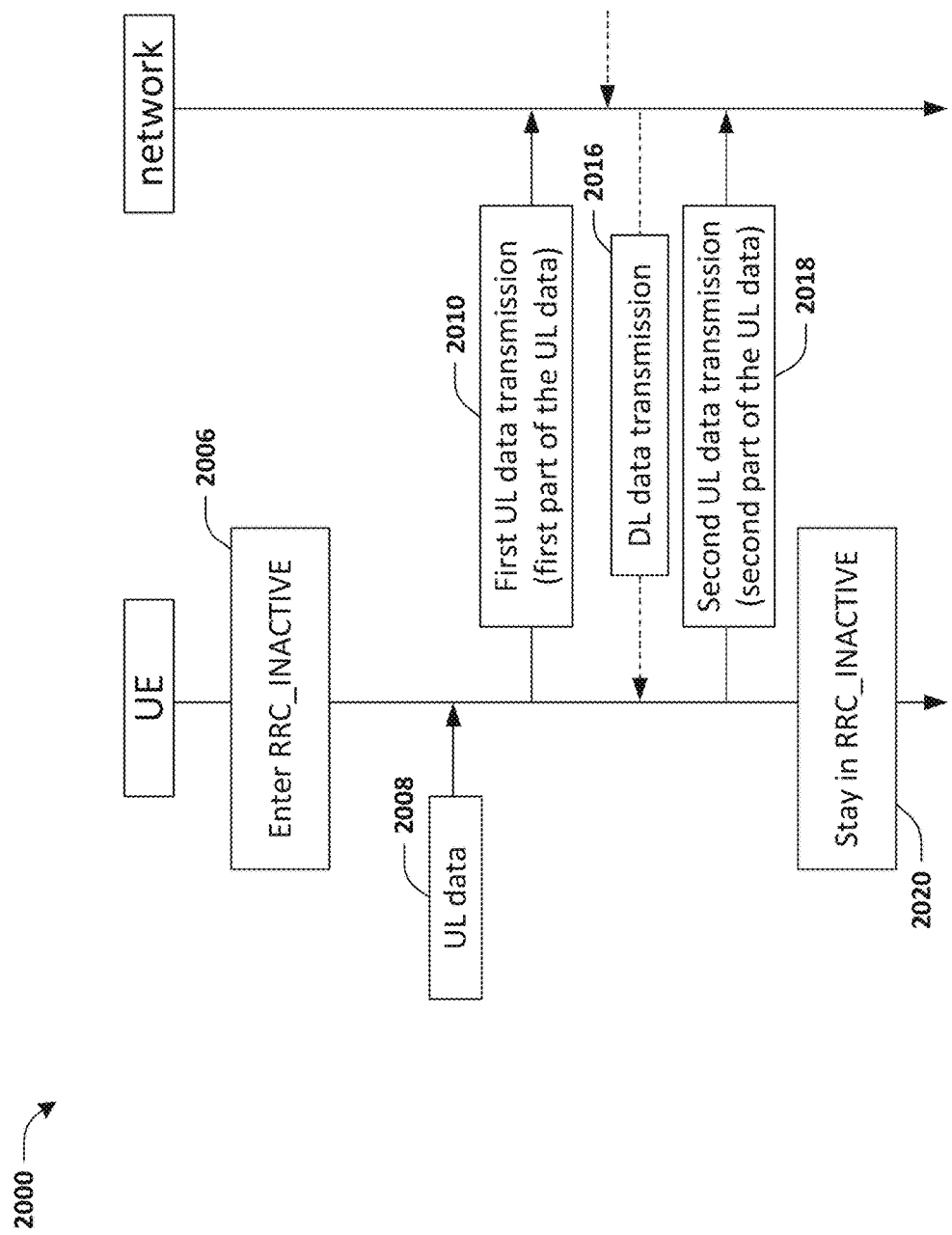
FIG. 20 is a diagram illustrating an exemplary scenario associated with multiple small data transmissions in RRC inactive state, according to one exemplary embodiment.

FIG. 20 illustrates an example scenario 2000 associated with multiple small data transmissions in RRC_INACTIVE state, according to some embodiments. The UE enters 2006 RRC_INACTIVE state. In some examples, the UE performs a first UL data transmission 2010, such as in response to arrival of UL data 2008. In some examples, the first UL data transmission 2010 comprises transmission of merely a first portion of the UL data 2008. In some examples, the network performs a DL data transmission 2016, such as in response to the first UL data transmission 2010. Alternatively and/or additionally, the network may not perform the DL data transmission 2016. In some examples, the UE performs a second UL data transmission 2018. In some examples, the second UL data transmission 2018 comprises a second portion of the UL data 2008. The UE stays 2020 in RRC_INACTIVE state throughout UL and/or DL transmissions of the example scenario 2000.

In some examples, for RACH-based small data transmission (e.g., 2-step and/or 4-step RACH-based small data transmission), the UE may adjust transmission power of the UE through power ramping during a Random Access procedure. For pre-configured PUSCH resources-based small data transmission, UE transmission power of the UE may be pre-configured by the network. In a scenario in which the UE has one or more subsequent UL data transmissions, since the network may want to adjust the UE transmission power (e.g., such that an adjusted UE transmission power is used in a subsequent UL transmission), it is beneficial that the network is provided with power headroom information of the UE (such that the network can adjust the UE transmission power based upon the power headroom information). However, always providing the power headroom information may result in a waste of UL resources (e.g., there are some scenarios in which it may not be beneficial to provide the power headroom information to the network). Accordingly, conditions in which the UE should provide power headroom information, as well as how the UE provides the power headroom information, need to be specified.

In some examples, the UE may include the power headroom information in an UL small data transmission. For example, the UE may include the power headroom information in a Msg3 Medium Access Control Protocol Data Unit (MAC PDU) of a 4-step RACH procedure. Alternatively and/or additionally, the UE may include the power headroom information in a MsgA MAC PDU of a 2-step RACH procedure. Alternatively and/or additionally, the UE may include the power headroom information in a MAC PDU transmitted using pre-configured PUSCH resources.

In some examples, transmission of a MAC PDU (e.g., the Msg3 MAC PDU, the MsgA MAC PDU, or the MAC PDU using pre-configured PUSCH resources) comprising the power headroom information may fail. In a scenario in which transmission of the MAC PDU comprising the power headroom information fails, the UE may update the power headroom information comprised in the MAC PDU before performing retransmission of the MAC PDU.

Techniques of Example Embodiment 1 and/or Example Embodiment 2 may be implemented for the UE to include the power headroom information in an UL small data transmission.

Example Embodiment 1

In Example Embodiment 1, the UE may trigger a Power Headroom Report (PHR) in response to initiating a small data transmission procedure in RRC_INACTIVE state.

In an example, a RRC layer of the UE may indicate to a MAC layer of the UE that a small data transmission procedure has been initiated, and the MAC layer may trigger the PHR in response to the indication that the small data transmission procedure has been initiated.

In an example, for pre-configured PUSCH resources-based small data transmission, the MAC layer of the UE may trigger the PHR in response to receiving a pre-configured UL grant from the RRC layer.

In some examples, the UE may trigger the PHR before the UE receives a first UL resource (e.g., an initial UL resource) for a new transmission.

Alternatively and/or additionally, the UE may trigger the PHR for a subsequent UL small data transmission (during RRC_INACTIVE state) (e.g., the subsequent UL small data transmission may correspond to an UL small data transmission that follows another small data transmission in RRC_INACTIVE state). For example, after the UE transmits a first UL small data in RRC_INACTIVE state (such as an initial UL small data transmission in RRC_INACTIVE state), the UE triggers the PHR in response to and/or based upon the UE determining that there is a subsequent UL data transmission in RRC_INACTIVE state (e.g., the UE may trigger the PHR when and/or after the UE determines there is the subsequent UL data transmission in RRC_INACTIVE state). Alternatively and/or additionally, after the UE transmits the first UL small data in RRC_INACTIVE state, the UE triggers the PHR in response to and/or based upon the UE receiving an UL resource for the subsequent UL data transmission (e.g., the UE may trigger the PHR when and/or after the UE receives the UL resource for the subsequent UL data transmission). In some examples, the UE includes the power headroom information in the MAC PDU for the subsequent UL small data transmission.

In some examples, the UE does not start or restart a phr-ProhibitTimer timer in response to including the power headroom information in a MAC PDU for transmission. In some examples, the UE does not start or restart a phr-PeriodicTimer timer in response to including the power headroom information in a MAC PDU for transmission.

Example Embodiment 2

In Example Embodiment 2, the UE may include a first MAC control element in the MAC PDU without triggering PHR.

For small data transmission in RRC_INACTIVE state, the UE may include (e.g., may always include) a first MAC control element in the MAC PDU to be transmitted in a Msg3 and/or MsgA or to be transmitted using one or more pre-configured PUSCH resources.

The first MAC control element may carry (e.g., comprise and/or indicate) the power headroom information. The first MAC control element may comprise, such as in addition to carrying the power headroom information, information related to a buffer status of the UE (e.g., the first MAC control element may be indicative of the buffer status of the UE). The first MAC control element may indicate, such as in addition to carrying the power headroom information, whether or not the UE expects one or more subsequent UL and/or DL data transmissions.

Alternatively and/or additionally, the UE may include the first MAC control element in the MAC PDU for a subsequent UL small data transmission (during RRC_INACTIVE state) (e.g., the subsequent UL small data transmission may correspond to an UL small data transmission that follows another small data transmission in RRC_INACTIVE state). For example, after the UE transmits a first UL small data in RRC_INACTIVE state (such as an initial UL small data transmission in RRC_INACTIVE state), the UE includes the first MAC control element in the MAC PDU for the subsequent UL small data transmission in RRC_INACTIVE state.

In some examples, the network may indicate (e.g., indicate to the UE) whether or not the UE should include the first MAC control element in the MAC PDU. In some examples, the indication may be provided to the UE via broadcasted System Information. Alternatively and/or additionally, the indication may be provided to the UE via a dedicated configuration.

In some examples, the first MAC control element comprises a field indicating $P_{CMAX,f,c}$ of the UE. Alternatively and/or additionally, the first MAC control element may not comprise a field indicating $P_{CMAX,f,c}$ of the UE.

Techniques of Example Embodiment 3, Example Embodiment 4, Example Embodiment 5, Example Embodiment 6 and/or Example Embodiment 7 may be implemented for the UE to determine whether or not to trigger PHR and/or for the UE to include the power headroom information in an UL small data transmission (when the UE is in RRC_INACTIVE state).

Example Embodiment 3

In Example Embodiment 3, the UE may trigger PHR if a first UL resource cannot accommodate first pending data available for transmission.

In some examples, the first pending data available for transmission may comprise all pending data available for transmission (e.g., all data that is pending and available for transmission by the UE to a network).

In scenarios in which the first UL resource (e.g., an initial UL resource for an initial UL small data transmission in RRC_INACTIVE state) cannot accommodate the first pending data available for transmission (e.g., all pending data available for transmission), a subsequent UL data transmission is necessary to transmit all of the first pending data available for transmission. Since the subsequent UL data transmission is necessary for transmission of all of the pending data, the power headroom information may be beneficial (e.g., the power headroom information may enable adjustment of UE transmission power for the subsequent UL data transmission), and the UE may trigger PHR accordingly. For example, the UE may trigger PHR based upon a determination that the first UL resource does not accommodate the first pending data available for transmission (e.g., all pending data available for transmission). Alternatively and/or additionally, the UE may trigger PHR based upon a determination that the subsequent UL data transmission is necessary for transmission of at least some of the pending data. Alternatively and/or additionally, the UE may trigger PHR based upon a determination that the subsequent UL data transmission will occur. If the first UL resource can accommodate the first pending data available for transmission (e.g., all pending data available for transmission), the subsequent UL data transmission may not be necessary for transmission of the first pending data available for transmission (and/or there may be no subsequent UL data transmission). In some examples, if the first UL resource can accommodate the first pending data available for transmission (e.g., all pending data available for transmission), the UE may not trigger PHR accordingly.

Alternatively and/or additionally, in association with a subsequent UL small data transmission (during RRC_INACTIVE state) (e.g., the subsequent UL small data transmission may correspond to an UL small data transmission that is after an initial small data transmission in RRC_INACTIVE state), the UE may determine to trigger PHR if an UL resource for the subsequent UL small data transmission cannot accommodate the first pending data available for transmission (e.g., all pending data available for transmission). For example, after the UE transmits first UL small data in RRC_INACTIVE state, in response to receiving an UL resource for a subsequent UL small data transmission in RRC_INACTIVE state, the UE may trigger a PHR if the UL resource cannot accommodate the first pending data available for transmission (e.g., all pending data available for transmission).

Alternatively and/or additionally, in association with a subsequent UL small data transmission (during RRC_INACTIVE state) (e.g., the subsequent UL small data transmission may correspond to an UL small data transmission that is after an initial small data transmission in RRC_INACTIVE state), the UE may determine to trigger PHR (and/or the UE may trigger PHR) if the UE receives an indication indicating that the UE should trigger PHR. In some examples, the UE may receive the indication in an UL grant for the subsequent UL small data transmission. Alternatively and/or additionally, the UE may receive the indication in a DL message received from the network prior to the subsequent UL small data transmission.

In some examples, if the UE determines to trigger PHR, the UE may not start or restart the phr-ProhibitTimer timer in response to including the power headroom information in a MAC PDU for transmission. Alternatively and/or additionally, if the UE determines to trigger PHR, the UE may not start or restart the phr-PeriodicTimer timer in response to including the power headroom information in a MAC PDU for transmission.

Example Embodiment 4

In Example Embodiment 4, the UE may cancel a triggered PHR if a first UL resource (e.g., an UL resource for small data transmission) can accommodate first pending data available for transmission.

In some examples, the first pending data available for transmission may comprise all pending data available for transmission (e.g., all data that is pending and available for transmission by the UE to a network).

The UE may determine whether or not to cancel a triggered PHR based upon whether or not the first UL resource (e.g., an UL resource for an initial small data transmission in RRC_INACTIVE state or a subsequent small data transmission in RRC_INACTIVE state) can accommodate the first pending data available for transmission (e.g., all pending data available for transmission) (and/or the power headroom information).

The UE may cancel a triggered PHR if the first UL resource can accommodate the first pending data available for transmission (e.g., all pending data available for transmission). Otherwise, the UE may not cancel the triggered PHR (e.g., the UE may not cancel the triggered PHR if the first UL resource cannot accommodate the first pending data available for transmission, such as all pending data available for transmission). In some examples, if the PHR is triggered in RRC_CONNECTED state and if the UL resource can accommodate the first pending data available for transmission (e.g., all pending data available for transmission), the UE may not cancel the triggered PHR. Alternatively and/or additionally, if the PHR is triggered in RRC_CONNECTED state, in determining whether or not to cancel the triggered PHR, the UE may not consider whether or not the UL resource can accommodate the first pending data available for transmission (e.g., all pending data available for transmission).

Alternatively and/or additionally, the UE may cancel a triggered PHR if the first UL resource can accommodate the first pending data available for transmission (e.g., all pending data available for transmission) but is not sufficient to additionally accommodate the power headroom information. Otherwise, the UE may not cancel the triggered PHR (e.g., the UE may not cancel the triggered PHR if the first UL resource can accommodate the first pending data available for transmission (e.g., all pending data available for transmission) and additionally accommodate the power headroom information). In some examples, if the PHR is triggered in RRC_CONNECTED state, and if the UL resource can accommodate the first pending data available for transmission (e.g., all pending data available for transmission) but is not sufficient to additionally accommodate the power headroom information, the UE may not cancel the triggered PHR. Alternatively and/or additionally, if the PHR is triggered in RRC_CONNECTED state, in determining whether or not to cancel the triggered PHR, the UE may not consider whether or not the UL resource can accommodate the first pending data available for transmission (e.g., all pending data available for transmission) and additionally accommodate the power headroom information.

Alternatively and/or additionally, in association with a subsequent UL small data transmission (during RRC_INACTIVE state) (e.g., the subsequent UL small data transmission may correspond to an UL small data transmission that is after an initial small data transmission in RRC_INACTIVE state), the UE may determine to cancel a triggered PHR if an UL resource for the subsequent UL small data transmission can accommodate the first pending data available for transmission (e.g., all pending data available for transmission). Otherwise, the UE may not cancel the triggered PHR (e.g., the UE may not cancel the triggered PHR if the UL resource for the subsequent UL small data transmission cannot accommodate the first pending data available for transmission, such as all pending data available for transmission). For example, after the UE transmits first UL small data in RRC_INACTIVE state, in response to receiving an UL resource for a subsequent UL small data transmission in RRC_INACTIVE state, the UE may cancel a triggered PHR if the UL resource can accommodate the first pending data available for transmission (e.g., all pending data available for transmission) in RRC_INACTIVE state. In some examples, if the PHR is triggered in RRC_CONNECTED state, and if the UL resource can accommodate the first pending data available for transmission (e.g., all pending data available for transmission), the UE may not cancel the triggered PHR. Alternatively and/or additionally, if the PHR is triggered in RRC_CONNECTED state, in determining whether or not to cancel the triggered PHR, the UE may not consider whether or not the UL resource can accommodate the first pending data available for transmission (e.g., all pending data available for transmission).

Alternatively and/or additionally, in association with a subsequent UL small data transmission (during RRC_INACTIVE state) (e.g., the subsequent UL small data transmission may correspond to an UL small data transmission that is after an initial small data transmission in RRC_INACTIVE state), the UE may determine to cancel a triggered PHR if an UL resource for the subsequent UL small data transmission can accommodate the first pending data available for transmission (e.g., all pending data available for transmission) but is not sufficient to additionally accommodate the power headroom information. Otherwise, the UE may not cancel the triggered PHR (e.g., the UE may not cancel the triggered PHR if the UL resource for the subsequent UL small data transmission can accommodate the first pending data available for transmission (e.g., all pending data available for transmission) and additionally accommodate the power headroom information). For example, after the UE transmits first UL small data in RRC_INACTIVE state, in response to receiving an UL resource for a subsequent UL small data transmission in RRC_INACTIVE state, the UE may cancel a triggered PHR if the UL resource can accommodate the first pending data available for transmission (e.g., all pending data available for transmission) but is not sufficient to additionally accommodate the power headroom information. In some examples, if the PHR is triggered in RRC_CONNECTED state, and if the UL resource can accommodate the first pending data available for transmission (e.g., all pending data available for transmission) but is not sufficient to additionally accommodate the power headroom information, the UE may not cancel the triggered PHR. Alternatively and/or additionally, if the PHR is triggered in RRC_CONNECTED state, in determining whether or not to cancel the triggered PHR, the UE may not consider whether or not the UL resource can accommodate the first pending data available for transmission (e.g., all pending data available for transmission) and additionally accommodate the power headroom information.

One or more operations and/or techniques disclosed herein, such as those described with respect to Example Embodiment 3 and/or Example Embodiment 4, may be performed during (and/or in association with) a small data transmission procedure. For example, determinations and/or cancellations disclosed herein, such as those described with respect to Example Embodiment 3 and/or Example Embodiment 4, may be performed during (and/or in association with) a small data transmission procedure.

In some examples, the triggered PHR may be a PHR that is triggered when the UE is in RRC_INACTIVE state. Alternatively and/or additionally, the triggered PHR may be a PHR that is triggered during a small data transmission procedure.

In some examples, the triggered PHR may be a PHR that is triggered in response to initiating a small data transmission procedure in RRC_INACTIVE state. Alternatively and/or additionally, the triggered PHR may be a PHR that is triggered in response to a phr-ProhibitTimer timer expiring (and/or having been expired) and a path loss changing more than a threshold (e.g., phr-Tx-PowerFactorChange dB) for at least one activated Serving Cell of a MAC entity (e.g., any MAC entity) which is used as a pathloss reference since a last transmission (e.g., most recent transmission) of a PHR in the MAC entity when the MAC entity has UL resources for a new transmission. The triggered PHR may be a PHR that is triggered in response to expiration of a phr-PeriodicTimer timer. The triggered PHR may be a PHR that is triggered upon (and/or in response to) configuration and/or reconfiguration of power headroom reporting functionality (e.g., configuration and/or reconfiguration of the power headroom reporting functionality by one or more upper layers, such as RRC). In some examples, the configuration and/or reconfiguration of the power headroom reporting functionality may not disable the power headroom reporting functionality (e.g., the configuration and/or reconfiguration of the power headroom reporting functionality may not indicate, instruct and/or be used to disable the power headroom reporting functionality). In some examples, the configuration and/or reconfiguration of the power headroom reporting functionality may be via phr-Config (such as in a MAC Cell Group configuration, such as a default MAC Cell Group configuration).

In some examples, if the UE determines not to cancel the triggered PHR, the UE may not start and/or restart the phr-ProhibitTimer in response to including the power headroom information in a MAC PDU for transmission. In some examples, if the UE determines not to cancel the triggered PHR, the UE may not start and/or restart the phr-PeriodicTimer in response to including the power headroom information in a MAC PDU for transmission.

Example Embodiment 5

In Example Embodiment 5, the UE may trigger PHR if a first amount of pending data available for transmission is above a threshold (and/or is not below the threshold).

The first amount of pending data available for transmission may be an amount of pending data of the UE before the UE constructs (and/or starts to construct) a MAC PDU for transmission.

Alternatively, the first amount of pending data available for transmission may be an amount of remaining pending data (e.g., an estimated amount of remaining pending data) after the UE constructs a MAC PDU for transmission. In an example, the amount of remaining pending data may correspond to an amount of data that remains after construction of the MAC PDU (e.g., an amount of data that is not included, and/or cannot be included, in the MAC PDU, such as due to a size limitation of the MAC PDU). For example, before constructing (and/or before starting to construct) the MAC PDU, the UE may estimate the amount of remaining pending data after the UE constructs the MAC PDU for transmission. For example, if an amount of pending data available for transmission (such as before construction of the MAC PDU) is 100 bytes, and the MAC PDU can accommodate 60 bytes of data, then the amount of remaining pending data (e.g., the estimated amount of remaining pending data) may be 100-60=40 bytes.

In some examples, if the first amount of pending data available for transmission (such as corresponding to either of the above two definitions of the first amount of pending data available for transmission) is not above the threshold (and/or is below the threshold), the UE may not trigger PHR accordingly. In some examples, if the first amount of pending data available for transmission is above the threshold (and/or is not below the threshold), the UE may trigger PHR accordingly.

In some examples, the threshold is predefined (e.g., the threshold may be a fixed value). Alternatively and/or additionally, the threshold may be configured in a broadcasted System Information (e.g., a System Information that is related to small data transmission). Alternatively and/or additionally, the threshold may be configured in a dedicated configuration for the UE (e.g., a dedicated configuration, transmitted to the UE, that is related to small data transmission for the UE).

Alternatively, if the first amount of pending data available for transmission (such as corresponding to either of the above two definitions of the first amount of pending data available for transmission) is not above the threshold (and/or is below the threshold), the UE may cancel a triggered PHR. The triggered PHR may be a PHR that is triggered in response to initiating a small data transmission procedure in RRC_INACTIVE state.

Alternatively and/or additionally, in association with a subsequent UL small data transmission (during RRC_INACTIVE state) (e.g., the subsequent UL small data transmission may correspond to an UL small data transmission that is after an initial small data transmission in RRC_INACTIVE state), the UE may determine to trigger PHR if the first amount of pending data available for the subsequent UL small data transmission is above a threshold (and/or is not below the threshold). For example, after the UE transmits first UL small data in RRC_INACTIVE state, the UE may trigger a PHR if the first amount of pending data available for a subsequent UL small data transmission in RRC_INACTIVE state is above the threshold (and/or is not below the threshold).

Alternatively and/or additionally, in association with a subsequent UL small data transmission (during RRC_INACTIVE state) (e.g., the subsequent UL small data transmission may correspond to an UL small data transmission that is after an initial small data transmission in RRC_INACTIVE state), the UE may determine to cancel a triggered PHR if the first amount of pending data available for the subsequent UL small data transmission is not above the threshold (and/or is below the threshold). For example, after the UE transmits first UL small data in RRC_INACTIVE state, the UE may cancel a triggered PHR if the first amount of pending data available for a subsequent UL small data transmission in RRC_INACTIVE state is not above the threshold (and/or is below the threshold). In some examples, the triggered PHR may be a PHR that is triggered for the subsequent UL small data transmission in RRC_INACTIVE state. In some examples, if the PHR is triggered in RRC_CONNECTED state, and if the amount of pending data available for the subsequent UL small data transmission in RRC_INACTIVE state is not above the threshold (and/or is below the threshold), the UE may not cancel the triggered PHR. Alternatively and/or additionally, if the PHR is triggered in RRC_CONNECTED state, in determining whether or not to cancel the triggered PHR, the UE may not consider whether or not the amount of pending data available for the subsequent UL small data transmission in RRC_INACTIVE state is above the threshold.

Alternatively and/or additionally, in association with a subsequent UL small data transmission (during RRC_INACTIVE state) (e.g., the subsequent UL small data transmission may correspond to an UL small data transmission that is after an initial small data transmission in RRC_INACTIVE state), the UE may determine to trigger PHR if the UE receives an indication indicating that the UE should trigger PHR. In some examples, the UE may receive the indication in an UL grant for the subsequent UL small data transmission. Alternatively and/or additionally, the UE may receive the indication in a DL message received from the network prior to the subsequent UL small data transmission.

In some examples, if the UE determines to trigger PHR (and/or the UE does not cancel the triggered PHR), the UE may not start or restart the phr-ProhibitTimer timer in response to including the power headroom information in a MAC PDU for transmission. Alternatively and/or additionally, if the UE determines to trigger PHR (and/or the UE does not cancel the triggered PHR), the UE may not start or restart the phr-PeriodicTimer timer in response to including the power headroom information in a MAC PDU for transmission.

Example Embodiment 6

In Example Embodiment 6, if a first UL resource cannot accommodate first pending data available for transmission, the UE may include a first MAC control element in a MAC PDU without triggering PHR.

In some examples, the first pending data available for transmission may comprise all pending data available for transmission (e.g., all data that is pending and available for transmission by the UE to a network).

In scenarios in which the first UL resource (e.g., an initial UL resource for an initial UL small data transmission in RRC_INACTIVE) cannot accommodate the first pending data available for transmission (e.g., all pending data available for transmission), a subsequent UL data transmission is necessary to transmit all of the pending data. Since the subsequent UL data transmission is necessary for transmission of all of the pending data, the power headroom information may be beneficial (e.g., the power headroom information may enable adjustment of UE transmission power for the subsequent UL data transmission), and the UE may include the first MAC control element in the MAC PDU accordingly. For example, the UE may include the first MAC control element in the MAC PDU based upon a determination that the first UL resource does not accommodate the first pending data available for transmission (e.g., all pending data available for transmission). Alternatively and/or additionally, the UE may include the first MAC control element in the MAC PDU based upon a determination that the subsequent UL data transmission is necessary for transmission of at least some of the pending data. Alternatively and/or additionally, the UE may include the first MAC control element in the MAC PDU based upon a determination that the subsequent UL data transmission will occur. If the first UL resource can accommodate the first pending data available for transmission (e.g., all pending data available for transmission), the subsequent UL data transmission may not be necessary for transmission of the pending data (and/or there may be no subsequent UL data transmission). In some examples, if the first UL resource can accommodate the first pending data available for transmission (e.g., all pending data available for transmission), the UE may not include the first MAC control element in the MAC PDU accordingly.

The first MAC control element may carry (e.g., comprise and/or indicate) the power headroom information. The first MAC control element may comprise, such as in addition to carrying the power headroom information, information related to a buffer status of the UE (e.g., the first MAC control element may be indicative of the buffer status of the UE). The first MAC control element may indicate, such as in addition to carrying the power headroom information, whether or not the UE expects one or more subsequent UL and/or DL data transmissions.

Alternatively and/or additionally, the UE may not include the first MAC control element in the MAC PDU if the first UL resource can accommodate the first pending data available for transmission (e.g., all pending data available for transmission) but is not sufficient to additionally accommodate the first MAC control element.

Alternatively and/or additionally, in association with a subsequent UL small data transmission (during RRC_INACTIVE state) (e.g., the subsequent UL small data transmission may correspond to an UL small data transmission that is after an initial small data transmission in RRC_INACTIVE state), the UE may determine to include the first MAC control element in the MAC PDU for the subsequent UL small data transmission if the UL resource for the subsequent UL small data transmission cannot accommodate the first pending data available for transmission (e.g., all pending data available for transmission). For example, after the UE transmits the first UL small data in RRC_INACTIVE state, the UE may include the first MAC control element in the MAC PDU for a subsequent UL small data transmission in RRC_INACTIVE state if the UL resource for the subsequent UL small data transmission cannot accommodate the first pending data available for transmission (e.g., all pending data available for transmission).

Alternatively and/or additionally, in association with a subsequent UL small data transmission (during RRC_INACTIVE state) (e.g., the subsequent UL small data transmission may correspond to an UL small data transmission that is after an initial small data transmission in RRC_INACTIVE state), the UE may determine not to include the first MAC control element in the MAC PDU for the subsequent UL small data transmission if the UL resource for the subsequent UL small data transmission can accommodate the first pending data available for transmission (e.g., all pending data available for transmission), but is not sufficient to additionally accommodate the first MAC control element. For example, after the UE transmits the first UL small data in RRC_INACTIVE state, the UE may not include the first MAC control element in the MAC PDU for a subsequent UL small data transmission in RRC_INACTIVE state if the UL resource for the subsequent UL small data transmission can accommodate the first pending data available for transmission (e.g., all pending data available for transmission) but is not sufficient to additionally accommodate the first MAC control element.

In some examples, the network may indicate (e.g., indicate to the UE) whether or not the UE should include the first MAC control element in the MAC PDU (such as based upon one or more of the above conditions described with respect to Example Embodiment 6). In some examples, the indication may be provided to the UE via broadcasted System Information. Alternatively and/or additionally, the indication may be provided to the UE via a dedicated configuration.

In some examples, the first MAC control element comprises a field indicating $P_{CMAX,f,c}$ of the UE. Alternatively and/or additionally, the first MAC control element may not comprise a field indicating $P_{CMAX,f,c}$ of the UE.

Example Embodiment 7

In Example Embodiment 7, the UE may include a first MAC control element in a MAC PDU without triggering PHR if a first amount of pending data available for transmission is above a threshold (and/or is not below the threshold).

The first amount of pending data available for transmission may be an amount of pending data of the UE before the UE constructs (and/or starts to construct) a MAC PDU for transmission.

Alternatively, the first amount of pending data available for transmission may be an amount of remaining pending data (e.g., an estimated amount of remaining pending data) after the UE constructs a MAC PDU for transmission. In an example, the amount of remaining pending data may correspond to an amount of data that remains after construction of the MAC PDU (e.g., an amount of data that is not included, and/or cannot be included, in the MAC PDU, such as due to a size limitation of the MAC PDU). For example, before constructing (and/or before starting to construct) the MAC PDU, the UE may estimate the amount of remaining pending data after the UE constructs the MAC PDU for transmission. For example, if an amount of pending data available for transmission (such as before construction of the MAC PDU) is 100 bytes, and the MAC PDU can accommodate 60 bytes of data, then the amount of remaining pending data (e.g., the estimated amount of remaining pending data) may be 100-60=40 bytes.

In some examples, if the first amount of pending data available for transmission (such as corresponding to either of the above two definitions of the first amount of pending data available for transmission) is not above the threshold (and/or is below the threshold), the UE may not include the first MAC control element in the MAC PDU accordingly. In some examples, if the first amount of pending data available for transmission is above the threshold (and/or is not below the threshold), the UE may include the first MAC control element in the MAC PDU accordingly.

In some examples, the threshold is predefined (e.g., the threshold may be a fixed value). Alternatively and/or additionally, the threshold may be configured in a broadcasted System Information (e.g., a System Information that is related to small data transmission). Alternatively and/or additionally, the threshold may be configured in a dedicated configuration for the UE (e.g., a dedicated configuration, transmitted to the UE, that is related to small data transmission for the UE).

The first MAC control element may carry (e.g., comprise and/or indicate) the power headroom information. The first MAC control element may comprise, such as in addition to carrying the power headroom information, information related to a buffer status of the UE (e.g., the first MAC control element may be indicative of the buffer status of the UE). The first MAC control element may indicate, such as in addition to carrying the power headroom information, whether or not the UE expects one or more subsequent UL and/or DL data transmissions.

Alternatively and/or additionally, in association with a subsequent UL small data transmission (during RRC_INACTIVE state) (e.g., the subsequent UL small data transmission may correspond to an UL small data transmission that is after an initial small data transmission in RRC_INACTIVE state), the UE may determine to include the first MAC control element in the MAC PDU for the subsequent UL small data transmission if the first amount of pending data available for the subsequent UL small data transmission is above a threshold (and/or is not below the threshold). For example, after the UE transmits first UL small data in RRC_INACTIVE state, the UE may include the first MAC control element in the MAC PDU for a subsequent UL small data transmission in RRC_INACTIVE state if the first amount of pending data available for the subsequent UL small data transmission in RRC_INACTIVE state is above the threshold (and/or is not below the threshold).

In some examples, the network may indicate (e.g., indicate to the UE) whether or not the UE should include the first MAC control element in the MAC PDU (such as based upon one or more of the above conditions described with respect to Example Embodiment 7). In some examples, the indication may be provided to the UE via broadcasted System Information. Alternatively and/or additionally, the indication may be provided to the UE via a dedicated configuration.

In some examples, the first MAC control element comprises a field indicating $P_{CMAX,f,c}$ of the UE. Alternatively and/or additionally, the first MAC control element may not comprise a field indicating $P_{CMAX,f,c}$ of the UE.

With respect to one or more embodiments disclosed herein, in some examples, the power headroom information may be a PHR MAC CE. Alternatively and/or additionally, the power headroom information may be a MAC CE which comprises both power headroom information and buffer status information.

In a RRC Resume procedure in NR, the UE may apply a default MAC Cell Group configuration during initiation of the RRC Resume procedure. The default MAC Cell Group configuration comprises bsr-Config and phr-Config, wherein bsr-Config indicates a first default timer length for a first timer related to a BSR procedure and/or phr-Config indicates a second default timer length for a second timer related to a PHR procedure. The UE uses the first default timer length and/or the second default timer length for the first timer and/or the second timer, respectively, until corresponding parameters (e.g., timer lengths associated with the first timer and/or the second timer) are reconfigured by the network (such as upon reception of a RRC Resume message, where the UE may enter RRC_CONNECTED state in response to the RRC Resume message). The default MAC Cell Group configuration is predefined in 3GPP specification (such as discussed in 3GPP TS 38.331 V15.7.0) and may be common for some and/or all UEs.

In a scenario in which the UE performs small data transmission in RRC_INACTIVE state, the UE may perform data transmission without, or before, entering RRC_CONNECTED state (e.g., without or before receiving a RRC Resume message). The UE may use one or more default timer lengths for BSR procedure and/or PHR procedure during a small data transmission procedure. In some examples, however, the one or more default timer lengths for BSR procedure and/or PHR procedure may not be suitable for the use case of small data transmission in RRC_INACTIVE state.

Techniques of Example Embodiment 8, Example Embodiment 9 and/or Example Embodiment 10 may be implemented in order to solve the issue where a default timer length for BSR procedure and/or PHR procedure is not suitable for small data transmission in RRC_INACTIVE state. In the present disclosure, such as in description of Example Embodiment 8, Example Embodiment 9 and/or Example Embodiment 10, "the current default MAC Cell Group Configuration" may refer to a default MAC Cell Group Configuration that is currently defined (such as currently defined in 3GPP specification).

Example Embodiment 8

In Example Embodiment 8, the UE may apply a second default MAC Cell Group configuration in a small data transmission procedure.

In some examples, the second default MAC Cell Group configuration may be defined for small data transmission procedures. Parameters comprised in the second default MAC Cell Group configuration may have fixed values (e.g., the parameters of the second default MAC Cell Group configuration may be predefined and/or may not be configured by the network). In some examples, upon (and/or in response to) initiation of a RRC Resume procedure, the UE may determine whether to apply the second default MAC Cell Group configuration or the current default MAC Cell Group configuration. The determination of whether to apply the second default MAC Cell Group configuration or the current default MAC Cell Group configuration may be based upon whether or not the RRC Resume procedure is for small data transmission in RRC_INACTIVE state. For example, the UE may apply the second default MAC Cell Group configuration if the RRC Resume procedure is for small data transmission in RRC_INACTIVE state. Alternatively and/or additionally, the UE may apply the current default MAC Cell Group configuration if the RRC Resume procedure is not for small data transmission in RRC_INACTIVE state.

A first timer length for a timer (e.g., at least one of periodicBSR-Timer, retxBSR-Timer, phr-PeriodicTimer, phr-ProhibitTimer, etc.) comprised in the second default MAC Cell Group configuration may be different from a second timer length for the timer comprised in the current default MAC Cell Group configuration. In some examples, the second default MAC Cell Group configuration may comprise a parameter (e.g., drx-Config) that is not comprised in the current default MAC Cell Group configuration. Alternatively and/or additionally, the current default MAC Cell Group configuration may comprise a parameter (e.g., at least one of bsr-Config, phr-Config, etc.) that is not comprised in the second default MAC Cell Group configuration.

In some examples, the second default MAC Cell Group configuration may comprise one or more parameters that are associated with (e.g., specific to) the small data transmission procedure in RRC_INACTIVE state. In some examples, the second default MAC Cell Group configuration may comprise a bsr-config. Alternatively, the second default MAC Cell Group configuration may not comprise a bsr-config. In some examples, the second default MAC Cell Group configuration may comprise a phr-config. Alternatively, the second default MAC Cell Group configuration may not comprise a phr-config. In some examples, the second default MAC Cell Group configuration may comprise a drx-config. Alternatively, the second default MAC Cell Group configuration may not comprise a drx-config.

In some examples, the UE may release the second default MAC Cell Group configuration in response to reception of a RRC Release message from the network.

In some examples, the UE may apply the current default MAC Cell Group configuration in response to reception of a RRC Resume message from the network, if the received RRC Resume message does not comprise a mac-CellGroupConfig. In some examples, if the RRC Resume message comprises a mac-CellGroupConfig, the UE may not apply the current default MAC Cell Group configuration (and may rather apply the second default MAC Cell Group configuration) in response to reception of the RRC Resume message from the network.

Example Embodiment 9

In Example Embodiment 9, the UE may not apply the current default MAC Cell Group configuration in a small data transmission procedure.

In some examples, the UE may not apply any MAC Cell Group configuration in the small data transmission procedure.

In some examples, a BSR procedure and/or a PHR procedure may not be required in the small data transmission procedure, such as due to a number of transmissions of the small data transmission procedure (e.g., the number of transmissions of the small data transmission procedure may be less than a number of transmissions of other types of transmission procedures). The UE may disable (and/or not enable) BSR and/or PHR functionality by not applying the current default MAC Cell Group configuration (and/or by not applying any MAC Cell Group configuration) in the small data transmission procedure.

In some examples, upon (and/or in response to) initiation of a RRC Resume procedure, the UE may determine whether or not to apply the current default MAC Cell Group configuration based upon whether or not the RRC Resume procedure is for small data transmission in RRC_INACTIVE state. For example, the UE may not apply the current default MAC Cell Group configuration if the RRC Resume procedure is for small data transmission in RRC_INACTIVE state. Alternatively and/or additionally, the UE may apply the current default MAC Cell Group configuration if the RRC Resume procedure is not for small data transmission in RRC_INACTIVE state.

In some examples, upon (and/or in response to) initiation of a RRC Resume procedure, the UE may determine whether or not to apply any MAC Cell Group configuration based upon whether or not the RRC Resume procedure is for small data transmission in RRC_INACTIVE state. For example, the UE may not apply any MAC Cell Group configuration if the RRC Resume procedure is for small data transmission in RRC_INACTIVE state. Alternatively and/or additionally, the UE may apply a MAC Cell Group configuration, such as the current default MAC Cell Group configuration, if the RRC Resume procedure is not for small data transmission in RRC_INACTIVE state.

Alternatively and/or additionally, upon (and/or in response to) initiation of a RRC Resume procedure for small data transmission in RRC_INACTIVE state, the UE may not apply the current default MAC Cell Group configuration (and/or the UE may not apply any MAC Cell Group configuration) if the UE determines that there is no subsequent UL small data transmission in RRC_INACTIVE state. Alternatively and/or additionally, upon (and/or in response to) initiation of a RRC Resume procedure for small data transmission in RRC_INACTIVE state, the UE may apply the current default MAC Cell Group configuration if the UE determines that there is a subsequent UL small data transmission in RRC_INACTIVE state.

Alternatively and/or additionally, upon (and/or in response to) initiation of a RRC Resume procedure for small data transmission in RRC_INACTIVE state, the UE may not apply the current default MAC Cell Group configuration (and/or the UE may not apply any MAC Cell Group configuration) if the UE determines that the data available for transmission is below a threshold (and/or is not above the threshold). Alternatively and/or additionally, upon (and/or in response to) initiation of a RRC Resume procedure for small data transmission in RRC_INACTIVE state, the UE may apply a MAC Cell Group configuration, such as the current default MAC Cell Group configuration, if the UE determines that the data available for transmission is not below the threshold (or is above the threshold).

In some examples, the UE may apply the current default MAC Cell Group configuration in response to reception of a RRC Resume message from the network, if the received RRC Resume message does not comprise a mac-CellGroup-Config. In some examples, if the RRC Resume message comprises a mac-CellGroupConfig, the UE may not apply the current default MAC Cell Group configuration (and/or may not apply any MAC Cell Group configuration) in response to reception of the RRC Resume message from the network.

Example Embodiment 10

In Example Embodiment 10, the UE may apply at least some parameters comprised in a dedicated MAC Cell Group configuration in small data transmission procedure.

In some examples, each UE of a plurality of UEs may be provided and/or configured with a MAC Cell Group configuration dedicated for the UE to use for small data transmission procedure (e.g., a MAC Cell Group configuration that one UE of the plurality of UEs is provided and/or configured with may be different than a MAC Cell Group configuration that another UE of the plurality of UEs is provided and/or configured with).

In some examples, the UE may be configured (by the network) with a dedicated MAC Cell Group configuration to be used for small data transmission procedure. The UE may receive the dedicated MAC Cell Group configuration for small data transmission procedure in a configuration related to small data transmission procedure. The UE may receive the dedicated MAC Cell Group configuration before or upon (and/or in response to) entering RRC_INACTIVE state. In some examples, the UE may receive the dedicated MAC Cell Group configuration in a RRC Reconfiguration message. In some examples, the UE may receive the dedicated MAC Cell Group configuration in a RRC Release message.

In some examples, upon (and/or in response to) initiation of a RRC Resume procedure, the UE may determine whether to apply the dedicated MAC Cell Group configuration or the current default MAC Cell Group configuration. The determination of whether to apply the dedicated MAC Cell Group configuration or the current default MAC Cell Group configuration may be based upon whether or not the RRC Resume procedure is for small data transmission in RRC_INACTIVE state. For example, the UE may apply the dedicated MAC Cell Group configuration if the RRC Resume procedure is for small data transmission in RRC_INACTIVE state. Alternatively and/or additionally, the UE may apply the current default MAC Cell Group configuration if the RRC Resume procedure is not for small data transmission in RRC_INACTIVE state.

A first timer length for a timer (e.g., at least one of periodicBSR-Timer, retxBSR-Timer, phr-PeriodicTimer, phr-ProhibitTimer, etc.) comprised in the dedicated MAC Cell Group configuration may be different from a second timer length for the timer comprised in the current default MAC Cell Group configuration. In some examples, the dedicated MAC Cell Group configuration may comprise a parameter (e.g., drx-Config) that is not comprised in the current default MAC Cell Group configuration. Alternatively and/or additionally, the current default MAC Cell Group configuration may comprise a parameter (e.g., at least one of bsr-Config, phr-Config, etc.) that is not comprised in the dedicated MAC Cell Group configuration.

In some examples, the dedicated MAC Cell Group configuration may comprise one or more parameters that are associated with (e.g., specific to) the small data transmission procedure in RRC_INACTIVE state. In some examples, the dedicated MAC Cell Group configuration may comprise a bsr-config. Alternatively, the dedicated MAC Cell Group configuration may not comprise a bsr-config. In some examples, the dedicated MAC Cell Group configuration may comprise a phr-config. Alternatively, the dedicated MAC Cell Group configuration may not comprise a phr-config. In some examples, the dedicated MAC Cell Group configuration may comprise a drx-config. Alternatively, the dedicated MAC Cell Group configuration may not comprise a drx-config.

In some examples, application of the dedicated MAC Cell Group configuration comprises application of all parameters comprised in the dedicated MAC Cell Group configuration. Alternatively and/or additionally, application of the dedicated MAC Cell Group configuration comprises application of a portion of parameters comprised in the dedicated MAC Cell Group configuration. In some examples, the portion of parameters comprises one or more parameters of the dedicated MAC Cell Group configuration.

In some examples, the portion of parameters may comprise one or more parameters that are associated with (e.g., specific to) the small data transmission procedure in RRC_INACTIVE state. In some examples, the portion of parameters may comprise a bsr-config. Alternatively, the portion of parameters may not comprise a bsr-config. In some examples, the portion of parameters may comprise a phr-config. Alternatively, the portion of parameters may not comprise a phr-config. In some examples, the portion of parameters may comprise a drx-config. Alternatively, the portion of parameters may not comprise a drx-config.

In some examples, the dedicated MAC Cell Group configuration may be a MAC Cell Group configuration (e.g., a MAC Cell Group configuration for a Master Cell Group) that is used by the UE in a last (e.g., most recent) RRC_CONNECTED state of the UE.

In some examples, the UE may release the dedicated MAC Cell Group configuration in response to reception of a RRC Release message from the network. Alternatively and/or additionally, the UE may store the dedicated MAC Cell Group configuration in response to reception of a RRC Release message from the network.

In some examples, the UE may apply the current default MAC Cell Group configuration in response to reception of a RRC Resume message from the network, if the received RRC Resume message does not comprise a mac-CellGroup-Config. In some examples, if the RRC Resume message comprises a mac-CellGroupConfig, the UE may not apply the current default MAC Cell Group configuration (and may rather apply the dedicated MAC Cell Group configuration) in response to reception of the RRC Resume message from the network.

One, some and/or all of the foregoing techniques and/or embodiments may be applicable to and/or implemented by a Reduced Capability NR Device (e.g., a NR_Light device). One, some and/or all of the foregoing techniques and/or embodiments may be applicable to and/or implemented by a normal NR Device.

With respect to one or more embodiments herein, in some examples, a RRC Resume procedure may be for small data transmission if an upper layer indicates (e.g., indicates to RRC layer) that a small data transmission procedure is initiated (and/or if the upper layer requests a suspended RRC connection to resume). In some examples, a RRC Resume procedure may be for small data transmission if the upper layer requests a suspended RRC connection to resume for transmitting small data in RRC_INACTIVE state.

With respect to one or more embodiments herein, in some examples, the UE may initiate the small data transmission procedure on a Serving Cell other than a last (e.g., most recent) Serving Cell (e.g., a last Primary Serving Cell) in RRC_CONNECTED state. In some examples, the UE may initiate the small data transmission procedure on the same Serving Cell as a last (e.g., most recent) Serving Cell (e.g., a last Primary Serving Cell) in RRC_CONNECTED state.

With respect to one or more embodiments herein, in some examples, application of a MAC Cell Group configuration (e.g., at least one of the current default MAC Cell Group configuration, the second default MAC Cell Group configuration, the dedicated MAC Cell Group configuration, etc.) comprises application of at least some parameters comprised in the MAC Cell Group configuration. Application of one or more parameters comprised in the MAC Cell Group configuration may comprise using the one or more parameters, such as by setting one or more timer lengths of one or more timers based upon a parameter of the one or more parameters and/or by performing one or more operations in accordance with the one or more parameters.

One, some and/or all of the foregoing techniques and/or embodiments can be formed to a new embodiment.

In some examples, embodiments disclosed herein, such as embodiments described with respect to Example Embodiment 1, Example Embodiment 2, Example Embodiment 3, Example Embodiment 4, Example Embodiment 5, Example Embodiment 6, Example Embodiment 7, Example Embodiment 8, Example Embodiment 9 and Example Embodiment 10, may be implemented independently and/or separately. Alternatively and/or additionally, a combination of embodiments described herein, such as embodiments described with respect to Example Embodiment 1, Example Embodiment 2, Example Embodiment 3, Example Embodiment 4, Example Embodiment 5, Example Embodiment 6, Example Embodiment 7, Example Embodiment 8, Example Embodiment 9 and/or Example Embodiment 10, may be implemented. Alternatively and/or additionally, a combination of embodiments described herein, such as embodiments described with respect to Example Embodiment 1, Example Embodiment 2, Example Embodiment 3, Example Embodiment 4, Example Embodiment 5, Example Embodiment 6, Example Embodiment 7, Example Embodiment 8, Example Embodiment 9 and/or Example Embodiment 10, may be implemented concurrently and/or simultaneously.

Various techniques of the present disclosure may be performed independently and/or separately from one another. Alternatively and/or additionally, various techniques of the present disclosure may be combined and/or implemented using a single system. Alternatively and/or additionally, various techniques of the present disclosure may be implemented concurrently and/or simultaneously.

Figure 21:
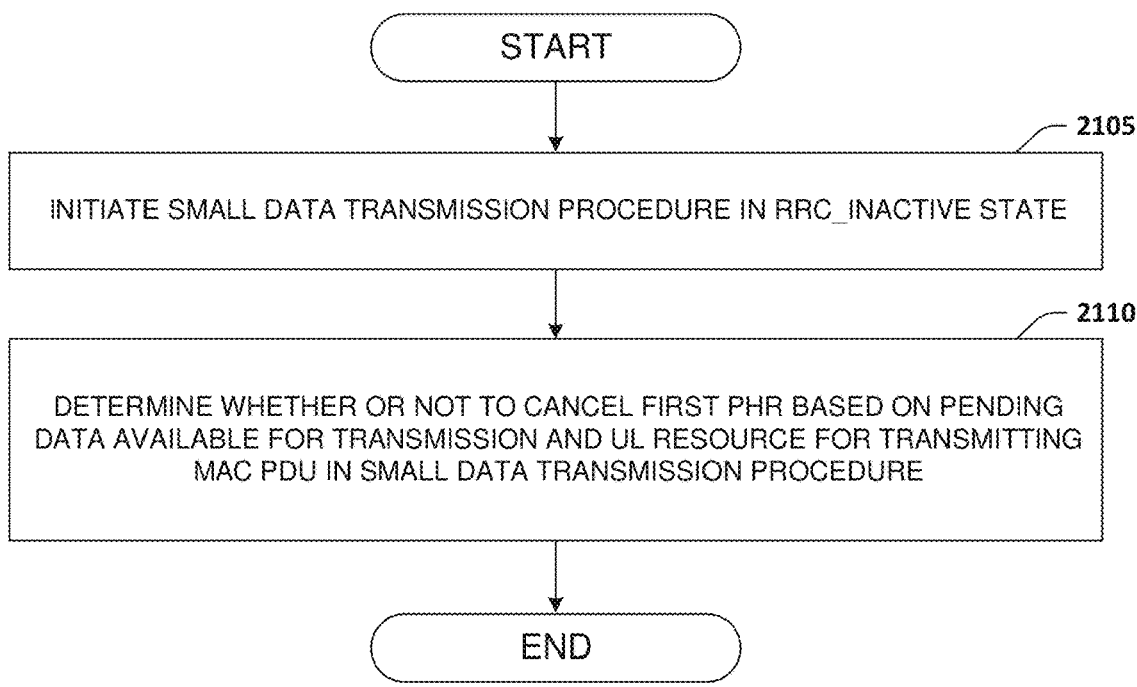
FIG. 21 is a flow chart according to one exemplary embodiment.

FIG. 21 is a flow chart 2100 according to one exemplary embodiment from the perspective of a UE. In step 2105, the UE initiates a small data transmission procedure in RRC_INACTIVE state. In step 2110, the UE determines whether or not to cancel a first PHR based upon pending data available for transmission and an UL Resource for transmitting a MAC PDU in the small data transmission procedure.

In one embodiment, the UE triggers the first PHR in response to initiating the small data transmission procedure.

In one embodiment, the UE determines to cancel the first PHR if the UL resource can accommodate all of the pending data available for transmission.

In one embodiment, the UE determines to cancel the first PHR if the UL resource can accommodate all of the pending data available for transmission but is not sufficient to additionally accommodate a power headroom information.

In one embodiment, the UE includes the power headroom information in the MAC PDU if the UE determines not to cancel the first PHR.

In one embodiment, the UE does not include the power headroom information in the MAC PDU if the UE determines to cancel the first PHR.

In one embodiment, the UE transmits the MAC PDU to a network node.

In one embodiment, the UE does not cancel a second PHR based upon pending data available for transmission and a second UL resource for transmitting a second MAC PDU if the second PHR is triggered in RRC_CONNECTED state. For example, if the second PHR is triggered when the UE is in RRC_CONNECTED state, the UE may not consider pending data available for transmission and the second UL resource to make a determination of whether or not to cancel the second PHR. Alternatively and/or additionally, if the second PHR is triggered when the UE is in RRC_CONNECTED state, the UE may not cancel the second PHR.

In one embodiment, the UE includes at least part of the pending data available for transmission in the MAC PDU.

In one embodiment, the small data transmission procedure is a RRC Resume procedure in NR (e.g., the small data transmission procedure is a type of RRC Resume procedure in NR).

In one embodiment, the UL resource is for transmitting a Msg3 in a 4-step Random Access procedure. For example, the UL resource may be configured and/or used for transmission of a Msg3 message in a 4-step Random Access procedure.

In one embodiment, the UL resource is for transmitting a MsgA in a 2-step Random Access procedure. For example, the UL resource may be configured and/or used for transmission of a MsgA message in a 2-step Random Access procedure.

In one embodiment, the UL resource is a pre-configured PUSCH resource.

In one embodiment, the UL resource is for a first UL transmission in the small data transmission procedure.

In one embodiment, the UL resource is for a second UL transmission (in the small data transmission procedure, for example) subsequent to a first UL transmission in the small data transmission procedure. For example, the UL resource may be configured and/or used for the second UL transmission.

In one embodiment, the UL resource is for a new transmission (e.g., an initial transmission) of the MAC PDU and is not for retransmission of the MAC PDU. For example, the UL resource may be configured and/or used for the new transmission of the MAC PDU.

In one embodiment, the power headroom information is a PHR MAC control element.

In one embodiment, the power headroom information comprises power headroom information and buffer status information.

Referring back to FIGS. 3 and 4, in one exemplary embodiment of a UE, the device 300 includes a program code 312 stored in the memory 310. The CPU 308 could execute program code 312 to enable the UE (i) to initiate a small data transmission procedure in RRC_INACTIVE state, and (ii) to determine whether or not to cancel a first PHR based upon pending data available for transmission and an UL Resource for transmitting a MAC PDU in the small data transmission procedure. Furthermore, the CPU 308 can execute the program code 312 to perform one, some and/or all of the above-described actions and steps and/or others described herein.

Figure 22:
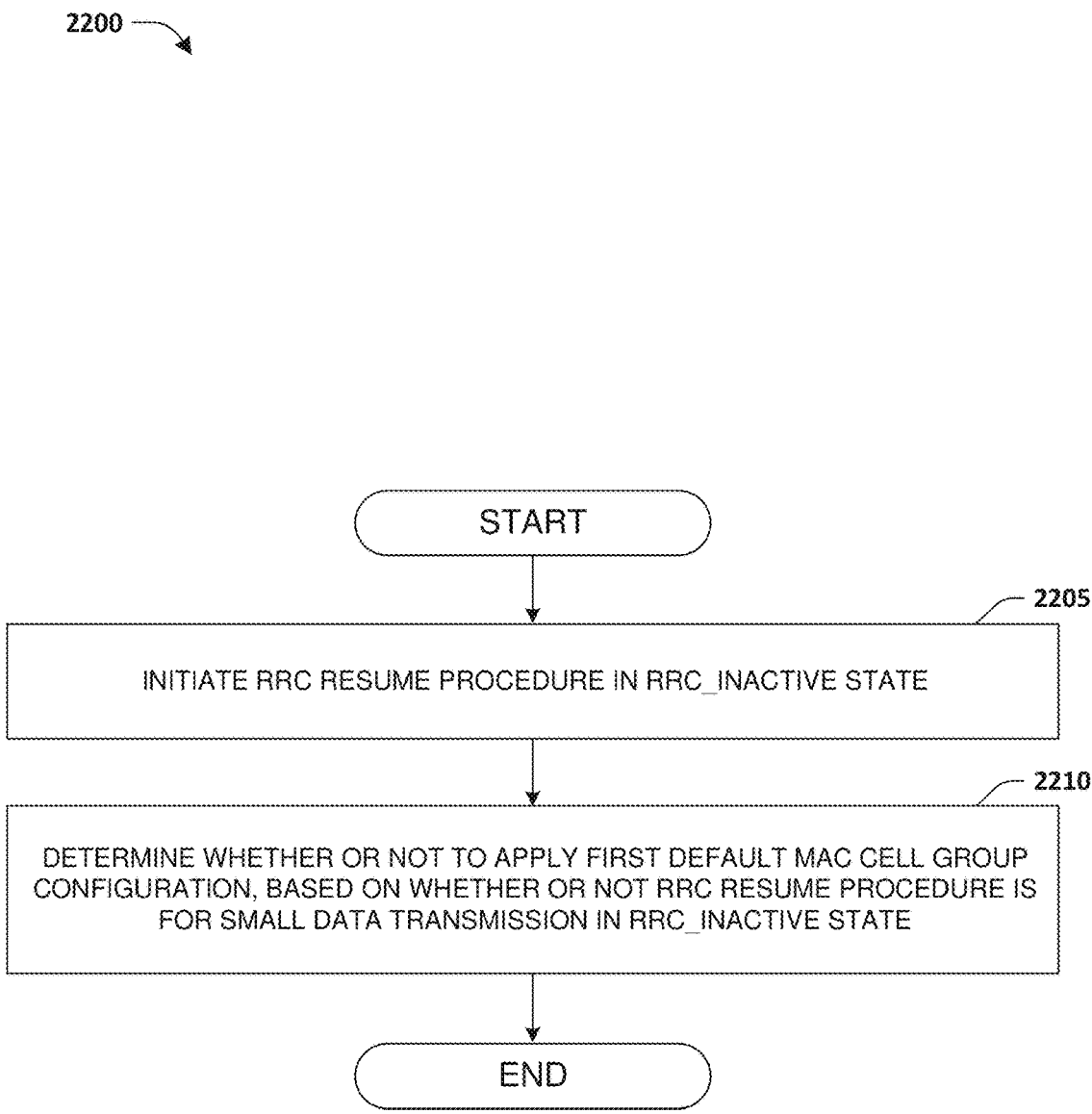
FIG. 22 is a flow chart according to one exemplary embodiment.

FIG. 22 is a flow chart 2200 according to one exemplary embodiment from the perspective of a UE. In step 2205, the UE initiates a RRC Resume procedure in RRC_INACTIVE state. In step 2210, the UE determines whether or not to apply a first default MAC Cell Group configuration based upon whether or not the RRC Resume procedure is for small data transmission in RRC_INACTIVE state.

In one embodiment, the UE applies a second default MAC Cell Group configuration if the RRC Resume procedure is for small data transmission in RRC_INACTIVE state.

In one embodiment, the UE does not apply the first default MAC Cell Group configuration if the RRC Resume procedure is for small data transmission in RRC_INACTIVE state.

In one embodiment, the UE does not apply any MAC Cell Group configuration if the RRC Resume procedure is for small data transmission in RRC_INACTIVE state.

In one embodiment, the UE applies at least a portion of a set of parameters comprised in a dedicated MAC Cell Group configuration if the RRC Resume procedure is for small data transmission in RRC_INACTIVE state.

In one embodiment, the UE applies the first default MAC Cell Group configuration if the RRC Resume procedure is not for small data transmission in RRC_INACTIVE state.

In one embodiment, parameters comprised in the first default MAC Cell Group configuration are predefined.

In one embodiment, parameters comprised in the second default MAC Cell Group configuration are predefined.

In one embodiment, parameters comprised in the dedicated MAC Cell Group configuration are configured by a network node.

In one embodiment, a first timer length, for a timer, comprised in the second default MAC Cell Group configuration is different from a second timer length, for the timer, comprised in the first default MAC Cell Group configuration. For example, the second MAC Cell Group configuration indicates the first timer length for the timer, and the first default MAC Cell Group configuration indicates the second timer length for the timer, where the first timer length is different than the second timer length.

In one embodiment, a first timer length, for a timer, comprised in the dedicated MAC Cell Group configuration is different from a second timer length, for the timer, comprised in the first default MAC Cell Group configuration. For example, the dedicated MAC Cell Group configuration indicates the first timer length for the timer, and the first default MAC Cell Group configuration indicates the second timer length for the timer, where the first timer length is different than the second timer length.

In one embodiment, the first default MAC Cell Group configuration comprises bsr-config and phr-config.

In one embodiment, the second default MAC Cell Group configuration comprises bsr-config, phr-config and/or drx-config.

In one embodiment, the second default MAC Cell Group configuration does not comprise bsr-config, phr-config and/or drx-config.

In one embodiment, the dedicated MAC Cell Group configuration comprises bsr-config, phr-config and/or drx-config.

In one embodiment, the dedicated MAC Cell Group configuration does not comprise bsr-config, phr-config and/or drx-config.

In one embodiment, the dedicated MAC Cell Group configuration is a MAC Cell Group configuration (a MAC Cell Group configuration for a Master Cell Group) that is used by the UE in a last (e.g., most recent) RRC_CONNECTED state of the UE.

In one embodiment, the UE receives the dedicated MAC Cell Group configuration in a RRC Reconfiguration message.

In one embodiment, the UE receives the dedicated MAC Cell Group configuration in a RRC Release message.

Referring back to FIGS. 3 and 4, in one exemplary embodiment of a UE, the device 300 includes a program code 312 stored in the memory 310. The CPU 308 could execute program code 312 to enable the UE (i) to initiate a RRC Resume procedure in RRC_INACTIVE state, and (ii) to determine whether or not to apply a first default MAC Cell Group configuration based upon whether or not the RRC Resume procedure is for small data transmission in RRC_INACTIVE state. Furthermore, the CPU 308 can execute the program code 312 to perform one, some and/or all of the above-described actions and steps and/or others described herein.

Figure 23:
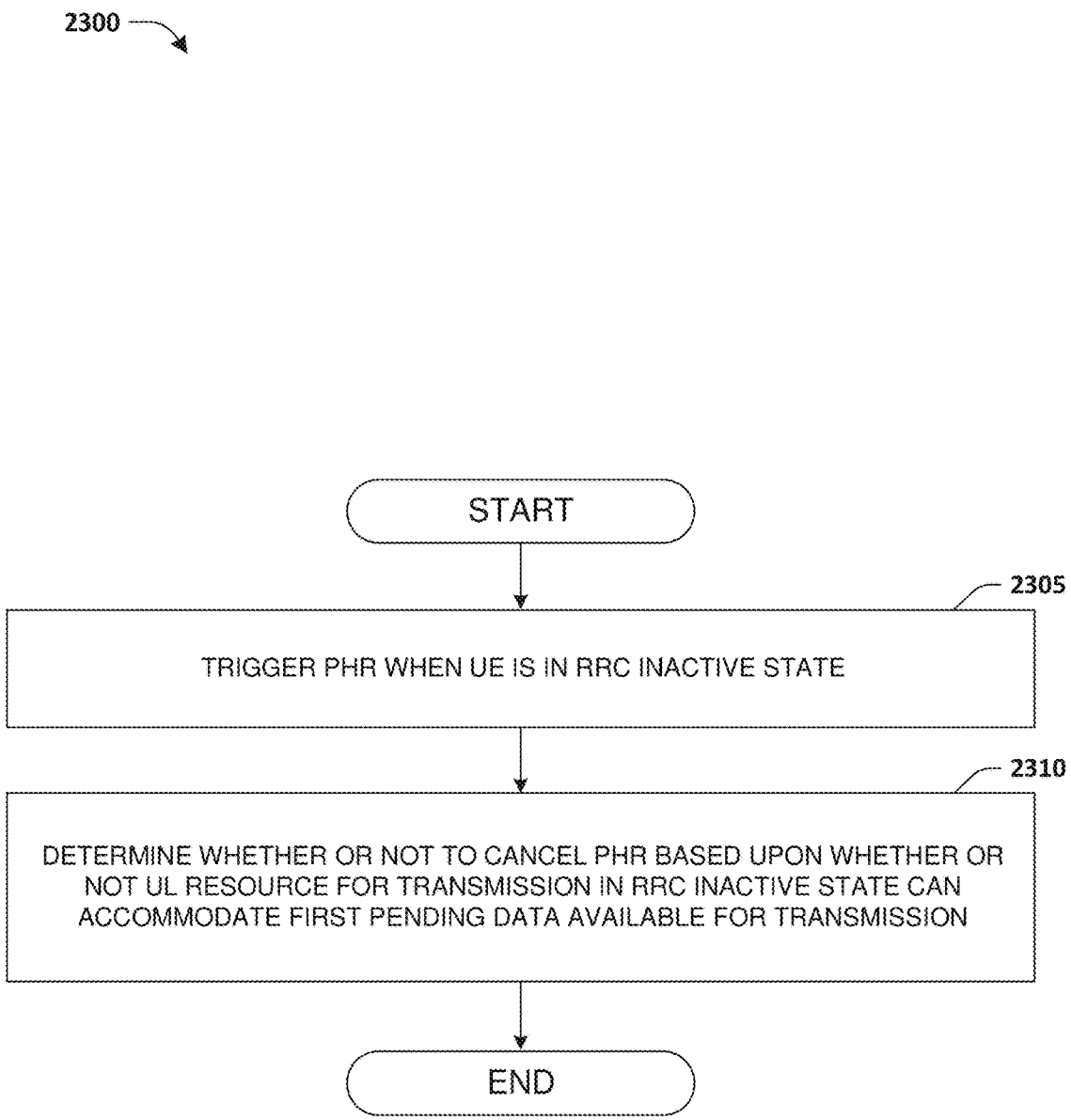
FIG. 23 is a flow chart according to one exemplary embodiment.

FIG. 23 is a flow chart 2300 according to one exemplary embodiment from the perspective of a UE. In step 2305, the UE triggers a PHR when the UE is in a RRC inactive state (e.g., RRC_INACTIVE state). In step 2310, the UE determines whether or not to cancel the PHR based upon whether or not an UL resource for transmission in the RRC inactive state can accommodate first pending data available for transmission (e.g., data that is pending and available for transmission by the UE to a network). For example, the first pending data available for transmission may comprise all pending data available for transmission (e.g., all data that is pending and available for transmission by the UE to a network).

In one embodiment, the first pending data available for transmission (e.g., the all pending data available for transmission) may correspond to data that is pending and available for transmission (by the UE) at a time when the UE triggers the PHR and/or at a time when the UE determines whether or not to cancel the PHR.

In one embodiment, the UE determines to cancel the PHR based upon a determination that the UL resource can accommodate the first pending data available for transmission (e.g., the all pending data available for transmission).

In one embodiment, the UE determines to cancel the PHR if the UL resource can accommodate the first pending data available for transmission (e.g., the all pending data available for transmission).

In an example, the UL resource can accommodate the first pending data available for transmission (e.g., the all pending data available for transmission) if a first amount of data that can be transmitted via the UL resource is greater than (or equal to) a second amount of data of the first pending data available for transmission.

In one embodiment, the UE determines to cancel the PHR based upon a determination that the UL resource can accommodate the first pending data available for transmission (e.g., the all pending data available for transmission) and cannot additionally accommodate a power headroom information (e.g., the UL resource is not sufficient to additionally accommodate the power headroom information).

In one embodiment, the UE determines to cancel the PHR if the UL resource can accommodate the first pending data available for transmission (e.g., the all pending data available for transmission) and cannot additionally accommodate the power headroom information (e.g., the UL resource is not sufficient to additionally accommodate the power headroom information).

In an example, the UL resource can accommodate the first pending data available for transmission (e.g., the all pending data available for transmission) and cannot additionally accommodate the power headroom information if a first amount of data that can be transmitted via the UL resource is greater than (or equal to) a second amount of data of the first pending data available for transmission, and the first amount of data is less than a third amount of data of a combination of the first pending data available for transmission and the power headroom information.

In one embodiment, the UE determines not to cancel the PHR based upon a determination that the UL resource cannot accommodate the first pending data available for transmission (e.g., the all pending data available for transmission).

In one embodiment, the UE determines not to cancel the PHR if the UL resource cannot accommodate the first pending data available for transmission (e.g., the all pending data available for transmission).

In an example, the UL resource cannot accommodate the first pending data available for transmission (e.g., the all pending data available for transmission) if a first amount of data that can be transmitted via the UL resource is less than a second amount of data of the first pending data available for transmission.

In one embodiment, the UE performs a transmission, via the UL resource, during a small data transmission procedure. In an example, the transmission may comprise transmission of at least some of the first pending data available for transmission (e.g., the all pending data available for transmission). In an example where the UL resource can accommodate the first pending data available for transmission, the transmission may comprise transmission of the first pending data available for transmission.

In one embodiment, the small data transmission procedure is a RRC connection resume procedure.

In one embodiment, the UL resource is a resource for transmission of a Msg3 message (of a 4-step Random Access procedure, for example), a resource for transmission of a MsgA message (of a 2-step Random Access procedure, for example), or a pre-configured PUSCH resource.

In one embodiment, the UE triggers the PHR upon (and/or in response to) configuration and/or reconfiguration of PHR functionality. In an example, the UE triggers the PHR upon (and/or in response to) configuration and/or reconfiguration of the PHR functionality by one or more upper layers, such as RRC.

In one embodiment, the UE triggers a second PHR when the UE is in RRC_CONNECTED state. The UE does not determine whether or not to cancel the second PHR based upon whether or not a second UL resource for transmission in the RRC connected state can accommodate second pending data available for transmission (e.g., all pending data available for transmission). In an example, if the second PHR is triggered when the UE is in RRC_CONNECTED state, the UE may not consider whether or not the second UL resource can accommodate the second pending data available for transmission to make a determination of whether or not to cancel the second PHR.

In one embodiment, the UE performs a transmission via the UL resource, wherein the transmission comprises a power headroom information if the UE determines not to cancel the PHR. In an example, the transmission may comprise transmission of at least some of the first pending data available for transmission (e.g., the all pending data available for transmission).

In one embodiment, the UE performs a transmission via the UL resource, wherein the transmission does not comprise a power headroom information if the UE determines to cancel the PHR. In an example, the transmission may comprise transmission of at least some of the first pending data available for transmission (e.g., the all pending data available for transmission). In an example where the UL resource can accommodate the first pending data available for transmission, the transmission may comprise transmission of the first pending data available for transmission.

Referring back to FIGS. 3 and 4, in one exemplary embodiment of a UE, the device 300 includes a program code 312 stored in the memory 310. The CPU 308 could execute program code 312 to enable the UE (i) to trigger a PHR when the UE is in a RRC inactive state (e.g., RRC_I-NACTIVE state), and (ii) to determine whether or not to cancel the PHR based upon whether or not an UL resource for transmission in the RRC inactive state can accommodate first pending data available for transmission. Furthermore, the CPU 308 can execute the program code 312 to perform one, some and/or all of the above-described actions and steps and/or others described herein.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 21-23. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 21-23, and/or one, some and/or all of the above-described actions and steps and/or others described herein.

It may be appreciated that applying one or more of the techniques presented herein may result in one or more benefits including, but not limited to, enabling a UE to determine whether or not to include power headroom information in a transmission and/or enabling the UE to include the power headroom information in the transmission if needed for small data transmission in RRC_INACTIVE state, which may lead to increased efficiency of communication between devices (e.g., the UE and/or a network node). Applying one or more of the techniques presented herein may result in one or more benefits including enabling a UE to apply (or not apply) a MAC configuration that is suitable for a small data transmission procedure in RRC_INACTIVE state, which may lead to increased efficiency of communication between devices (e.g., the UE and/or a network node).

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a User Equipment (UE), comprising:
   initiating a small data transmission procedure in Radio Resource Control (RRC) inactive state;
   triggering a Power Headroom Report (PHR) for transmission to a network node when the UE is in the RRC inactive state;
   after triggering the PHR:
      determining that an uplink (UL) resource for transmission in the RRC inactive state is able to accommodate all pending data available for transmission;
      determining that the UL resource for the transmission in the RRC inactive state is unable to additionally accommodate a power headroom information; and
      cancelling the PHR during the small data transmission procedure based upon the determination that the UL resource for the transmission in the RRC inactive state is able to accommodate all pending data available for transmission and the determination that the UL resource for the transmission in the RRC inactive state is unable to additionally accommodate the power headroom information;
   triggering a second PHR when the UE is in RRC connected state, wherein the UE does not cancel the second PHR based upon a determination that a second UL resource for a second transmission in the RRC connected state is able to accommodate all second pending data available for transmission and a determination that the second UL resource for the second transmission in the RRC connected state is unable to additionally accommodate a second power headroom information; and
   performing the second transmission via the second UL resource, wherein the second transmission comprises the second power headroom information.

2. The method of claim 1, wherein:
the triggering the PHR is performed in response to initiating the small data transmission procedure in the RRC inactive state.

3. The method of claim 1, wherein:
the power headroom information includes a PHR Medium Access Control (MAC) control element.

4. The method of claim 1, comprising:
performing the transmission, via the UL resource, during the small data transmission procedure.

5. The method of claim 1, wherein:
the small data transmission procedure is a RRC connection resume procedure.

6. The method of claim 1, wherein:
the UL resource is:
   a resource for transmission of a Msg3 message;
   a resource for transmission of a MsgA message;
   a pre-configured Physical Uplink Shared Channel (PUSCH) resource; or
   received by the UE after triggering the PHR.

7. The method of claim 1, wherein:
the triggering the PHR is performed upon at least one of configuration or reconfiguration of power headroom reporting functionality.

8. The method of claim 7, wherein:
the at least one of configuration or reconfiguration is via applying a default MAC Cell Group configuration.

9. The method of claim 1, comprising:
performing the transmission via the UL resource, wherein the transmission does not comprise the power headroom information.

10. A User Equipment (UE), comprising:
a control circuit;
a processor installed in the control circuit; and
a memory installed in the control circuit and operatively coupled to the processor, wherein the processor is configured to execute a program code stored in the memory to perform operations, the operations comprising:
   initiating a small data transmission procedure in Radio Resource Control (RRC) inactive state;
   triggering a Power Headroom Report (PHR) for transmission to a network node when the UE is in the RRC inactive state;
   after triggering the PHR:
      determining that an uplink (UL) resource for transmission in the RRC inactive state is able to accommodate first pending data available for transmission;
      determining that the UL resource for the transmission in the RRC inactive state is unable to additionally accommodate a power headroom information; and
      cancelling the PHR during the small data transmission procedure based upon the determination that the UL resource for the transmission in the RRC inactive state is able to accommodate the first pending data available for transmission and the determination that the UL resource for the transmission in the RRC inactive state is unable to additionally accommodate the power headroom information;
   triggering a second PHR when the UE is in RRC connected state, wherein the UE does not cancel the second PHR based upon a determination that a second UL resource for a second transmission in the RRC connected state is able to accommodate second pending data available for transmission and a determination that the second UL resource for the second transmission in the RRC connected state is unable to additionally accommodate a second power headroom information; and performing the second transmission via the second UL resource, wherein the second transmission comprises the second power headroom information.

11. The UE of claim 10, wherein:

the triggering the PHR is performed in response to initiating the small data transmission procedure in the RRC inactive state.

12. The UE of claim 10, wherein:

the power headroom information includes a PHR Medium Access Control (MAC) control element.

13. The UE of claim 10, wherein:

the triggering the PHR is performed upon at least one of configuration or reconfiguration of power headroom reporting functionality.

14. The UE of claim 13, wherein:

the at least one of configuration or reconfiguration is via applying a default MAC Cell Group configuration.

15. The UE of claim 10, the operations comprising:

performing the transmission, via the UL resource, during the small data transmission procedure, wherein the transmission does not comprise the power headroom information.

16. The UE of claim 10, wherein:

the small data transmission procedure is a RRC connection resume procedure.

17. The UE of claim 10, wherein:

the UL resource is:
 a resource for transmission of a Msg3 message;
 a resource for transmission of a MsgA message;
 a pre-configured Physical Uplink Shared Channel (PUSCH) resource; or
 received by the UE after triggering the PHR.

18. A non-transitory computer-readable medium comprising processor-executable instructions that when executed by a User Equipment (UE) cause performance of operations, the operations comprising:

initiating a small data transmission procedure in Radio Resource Control (RRC) inactive state;

triggering a Power Headroom Report (PHR) for transmission to a network node when the UE is in the RRC inactive state;

after triggering the PHR:
 determining that an uplink (UL) resource for transmission in the RRC inactive state is able to accommodate all pending data available for transmission;
 determining that the UL resource for the transmission in the RRC inactive state is unable to additionally accommodate a power headroom information; and
 cancelling the PHR during the small data transmission procedure based upon the determination that the UL resource for the transmission in the RRC inactive state is able to accommodate all pending data available for transmission and the determination that the UL resource for the transmission in the RRC inactive state is unable to additionally accommodate the power headroom information;

triggering a second PHR when the UE is in RRC connected state, wherein the UE does not cancel the second PHR based upon a determination that a second UL resource for a second transmission in the RRC connected state is able to accommodate second pending data available for transmission and a determination that the second UL resource for the second transmission in the RRC connected state is unable to additionally accommodate a second power headroom information; and performing the second transmission via the second UL resource, wherein the second transmission comprises the second power headroom information.

* * * * *